United States Patent
Hinkle et al.

(10) Patent No.: US 11,985,144 B2
(45) Date of Patent: *May 14, 2024

(54) BROWSER EXTENSION FOR CYBERSECURITY THREAT INTELLIGENCE AND RESPONSE

(71) Applicant: ThreatConnect, Inc., Arlington, VA (US)

(72) Inventors: Edward Hinkle, Frederick, MD (US); Mashell Rodriguez, Joshua Tree, CA (US); Marika Chauvin, New Orleans, LA (US); Daniel Cole, Reston, VA (US); Andrew Pendergast, Columbia, MD (US); Kathryn Grayson Nanz, Black Mountain, NC (US)

(73) Assignee: ThreatConnect, Inc., Arlington, VA (US)

(*) Notice: Subject to any disclaimer, the term of this patent is extended or adjusted under 35 U.S.C. 154(b) by 316 days.

This patent is subject to a terminal disclaimer.

(21) Appl. No.: 17/358,226

(22) Filed: Jun. 25, 2021

(65) Prior Publication Data
US 2022/0417263 A1    Dec. 29, 2022

(51) Int. Cl.
*H04L 9/40* (2022.01)
(52) U.S. Cl.
CPC .............. *H04L 63/1416* (2013.01)
(58) Field of Classification Search
CPC .................................. H04L 63/1416
USPC ........................................... 726/23
See application file for complete search history.

(56) References Cited

U.S. PATENT DOCUMENTS

| 8,090,797 | B2 | 1/2012 | Chinta et al. |
| 8,776,241 | B2 | 7/2014 | Zaitsev |
| 8,856,869 | B1* | 10/2014 | Brinskelle ........... H04L 63/0823 726/2 |
| 9,245,108 | B1* | 1/2016 | Khajuria ................. G06F 21/53 |
| 9,508,040 | B2 | 11/2016 | Bilal et al. |

(Continued)

FOREIGN PATENT DOCUMENTS

WO    WO-2009/034316 A2    3/2009

OTHER PUBLICATIONS

Roger Kwon; Cyber Threat dictionary; IEEE:2020; pp. 106-112.*

(Continued)

*Primary Examiner* — Monjur Rahim
(74) *Attorney, Agent, or Firm* — Faegre Drinker Biddle & Reath LLP

(57) ABSTRACT

Techniques are disclosed relate to systems, methods, and non-transitory computer readable media for implementing a browser extension for cyber threat intelligence and response. One system to perform operations comprising: receiving, in a sandbox of a browser by a browser extension, a selection of at least one particular indicator of compromise of the at least one of the indicator of compromise of at least scanned part of a web page; displaying one or more orchestrated responses; receiving a selection of at least one particular orchestrated response of the one or more orchestrated responses; transmitting the selected at least one particular orchestrated response to the cloud-based enrichment and analysis of cybersecurity threat intelligence system; receiving a response including a result of the at least one particular orchestrated response; and displaying the result of the at least one particular orchestrated response.

17 Claims, 28 Drawing Sheets

(56) References Cited

U.S. PATENT DOCUMENTS

| | | | |
|---|---|---|---|
| 9,565,204 | B2 | 2/2017 | Chesla |
| 9,838,417 | B1 | 12/2017 | Khalid et al. |
| 10,277,622 | B2 | 4/2019 | DiGiambattista et al. |
| 10,521,583 | B1* | 12/2019 | Bagulho Monteiro Pereira ......... G06F 21/53 |
| 10,614,213 | B1 | 4/2020 | Demsey et al. |
| 10,673,880 | B1* | 6/2020 | Pratt ................... H04L 63/1433 |
| 10,970,188 | B1* | 4/2021 | Åvist ................... H04L 63/1441 |
| 11,017,075 | B1 | 5/2021 | Hatem |
| 11,093,620 | B2 | 8/2021 | Tineo |
| 11,595,437 | B1* | 2/2023 | Mushtaq ............. H04L 63/1483 |
| 11,863,573 | B2 | 1/2024 | Tineo |
| 2007/0033631 | A1 | 2/2007 | Gordon et al. |
| 2007/0033651 | A1 | 2/2007 | Imanishi |
| 2007/0135936 | A1 | 6/2007 | Dumas et al. |
| 2007/0162890 | A1 | 7/2007 | Meier et al. |
| 2007/0300218 | A1 | 12/2007 | Mann |
| 2008/0168529 | A1 | 7/2008 | Anderson et al. |
| 2013/0219404 | A1 | 8/2013 | Yang |
| 2013/0246511 | A1 | 9/2013 | Brown et al. |
| 2015/0033341 | A1 | 1/2015 | Schmidtler et al. |
| 2015/0106825 | A1 | 4/2015 | Abbas et al. |
| 2015/0288712 | A1 | 10/2015 | Jones et al. |
| 2016/0021056 | A1 | 1/2016 | Chesla |
| 2016/0092283 | A1 | 3/2016 | Maes et al. |
| 2016/0307201 | A1* | 10/2016 | Turgeman ............. G06F 21/316 |
| 2016/0308991 | A1 | 10/2016 | Rutko |
| 2016/0371177 | A1 | 12/2016 | Aiello et al. |
| 2017/0163663 | A1 | 6/2017 | Gopalakrishnan et al. |
| 2017/0195353 | A1 | 7/2017 | Taylor et al. |
| 2017/0289191 | A1 | 10/2017 | Thioux et al. |
| 2018/0060132 | A1 | 3/2018 | Maru et al. |
| 2018/0091528 | A1 | 3/2018 | Shahbaz et al. |
| 2018/0103047 | A1* | 4/2018 | Turgeman ......... G06Q 20/4014 |
| 2018/0115595 | A1 | 4/2018 | Krishnan et al. |
| 2018/0219888 | A1* | 8/2018 | Apostolopoulos .......................... H04L 63/1425 |
| 2018/0300170 | A1 | 10/2018 | Basu et al. |
| 2019/0129764 | A1 | 5/2019 | Johnson et al. |
| 2019/0327135 | A1 | 10/2019 | Johnson et al. |
| 2019/0387005 | A1 | 12/2019 | Zawoad et al. |
| 2020/0042837 | A1* | 2/2020 | Skinner ................. G06F 18/217 |
| 2020/0137110 | A1* | 4/2020 | Tyler ................... H04L 63/1483 |
| 2020/0143060 | A1 | 5/2020 | Tineo |
| 2020/0151329 | A1* | 5/2020 | Chen ....................... H04L 63/20 |
| 2020/0174908 | A1* | 6/2020 | Chen ................... G06F 11/3438 |
| 2020/0279050 | A1* | 9/2020 | Endler ................ G06F 21/6218 |
| 2020/0358818 | A1 | 11/2020 | Stoletny et al. |
| 2020/0412767 | A1* | 12/2020 | Crabtree ............. H04L 63/1441 |
| 2021/0006544 | A1* | 1/2021 | Lewin ..................... H04L 63/20 |
| 2021/0067494 | A1* | 3/2021 | Azulay ............... H04L 63/1466 |
| 2021/0117544 | A1* | 4/2021 | Kurtz ................... G06F 21/566 |
| 2021/0133632 | A1 | 5/2021 | Elprin et al. |
| 2021/0218646 | A1 | 7/2021 | Dey |
| 2021/0273961 | A1* | 9/2021 | Humphrey .......... H04L 63/1416 |
| 2021/0374251 | A1 | 12/2021 | Tineo |
| 2021/0400019 | A1 | 12/2021 | Krstic et al. |
| 2022/0094705 | A1 | 3/2022 | Tineo |
| 2022/0101326 | A1* | 3/2022 | Kim .................... H04L 63/0464 |
| 2022/0414206 | A1 | 12/2022 | Hinkle et al. |

OTHER PUBLICATIONS

Office Action dated Sep. 14, 2023 for U.S. Appl. No. 17/358,181 with double-patenting rejections on pp. 2-4.

Office Action dated Sep. 7, 2023 for U.S. Appl. No. 17/396,625 with double-patenting rejections on pp. 2-6.

M. Shashanka, M. Shen and J. Wang, "User and entity behavior analytics for enterprise security," 2016 IEEE International Conference on Big Data (Big Data), Washington, DC, 2016, pp. 1867-1874.

Korean Intellectual Property Office, International Search Report and Written Opinion for International Application No. PCT/US2019/059656, dated Apr. 8, 2020.

Office Action dated Jul. 31, 2020 for U.S. Appl. No. 16/178,946.

Office Action dated Jan. 19, 2021 for U.S. Appl. No. 16/178,946.

Tineo, Danny, "Custom Triggers for a Network Security Event for Cybersecurity Threat Intelligence," U.S. Appl. No. 17/194,766, filed Mar. 8, 2021, including as-filed specification, claims, abstract and drawings, 54 pages.

Hinkle, Edward et al., "Browser Extension for Cybersecurity Threat Intelligence and Response," U.S. Appl. No. 17/358,181 filed Jun. 25, 2021, including as-filed specification, claims, abstract and drawings, 82 pages.

The International Bureau of WIPO, International Preliminary Report on Patentability for International Application No. PCT/US2019/059656, dated May 14, 2021.

* cited by examiner

BROWSER EXTENSION FOR CYBERSECURITY THREAT INTELLIGENCE AND RESPONSE

BACKGROUND

Conventionally, networks utilize Security Information and Event Management (SIEM) systems that provide analysis of security alerts to be used by end user network security analysts. The alerts may be provided in response to a cybersecurity threat or event such as a ransomware attack, code exploit, distributed denial of service attack, malware, and the like. These SIEM systems can gather and store this security alert information in historical logs that may be used to track security events and determine trends. Nevertheless, while these conventional SIEM systems can be effective in generating alerts and identifying risks, they require network security analysts to determine an appropriate security action in response to such alerts. Further, these alerts may not be sufficient for a network security analyst to take an appropriate response, and the analyst may be required to investigate the alert further by obtaining and examining cybersecurity threat intelligence data from other sources.

Threat intelligence can refer to evidence-based knowledge, including context, mechanisms, indicators, implications, and actionable advice, about an existing or emerging menace or hazard to assets that may be used to inform decisions regarding the subject's response to that menace or hazard. Threat data can refer to a list of malicious domains, a file hash, websites, Internet Protocol (IP) addresses, and other indicators of compromise (IOCs). Without an understanding of context, relevance, accuracy, or known association, the meaning of a single indicator or data point is difficult to obtain, which makes it unlikely that an appropriate response or next action can be mounted in response to a potential threat event. In view of the growing number of cybersecurity events, the rapidity by which such events can produce deleterious effects on a network, and the limited number of qualified network security analysts, the time for adequately responding to security events on the network using such conventional SIEM systems is slowing to the point such that it could compromise network security.

Currently, network security analysts must interrupt what they are doing and log into a SIEM system in order to gather information on indicators and/or perform automated actions on observables of interest, which may slow a response to a potential security threat. Thus, there exists a need for network security analysts to quickly gather information on indicators, determine security on the network by allowing the network security analysts to query threat data, and determine a reputation of a particular observable on the network, as well as to determine whether the observable should be investigated further.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

SUMMARY OF THE INVENTION

Figure 1:
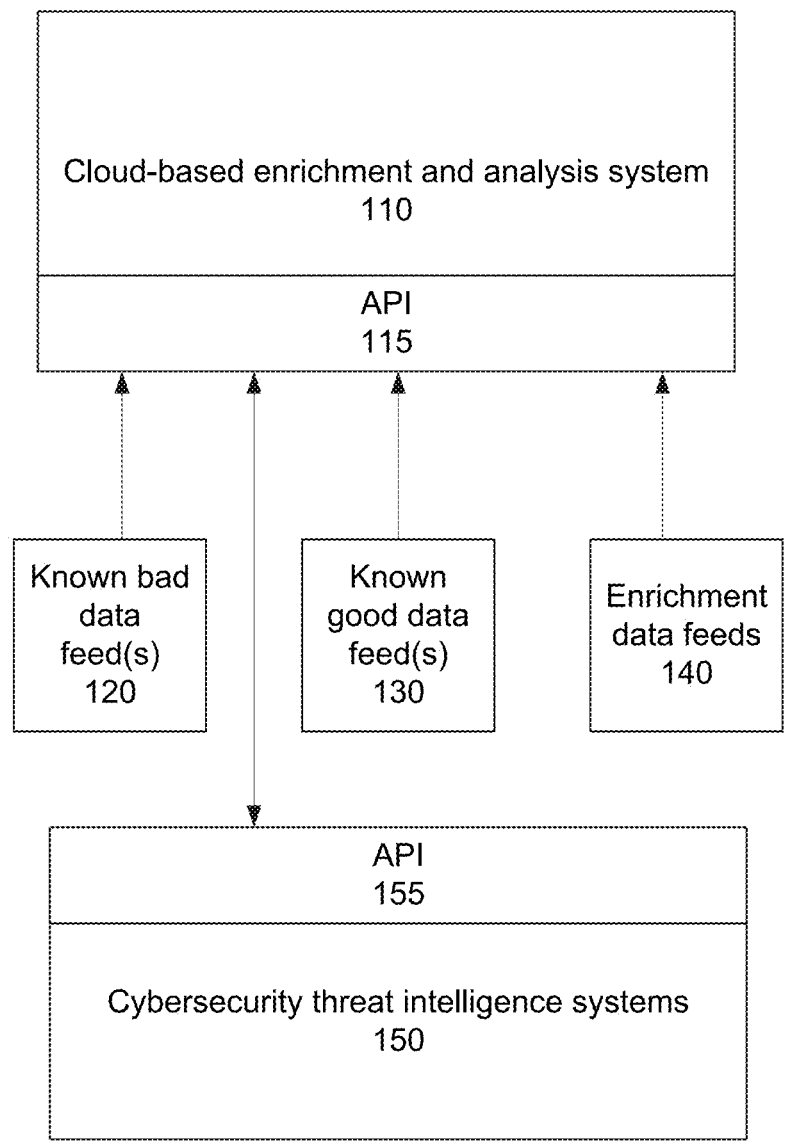
FIG. 1 is an example architecture for a system according to the embodiments disclosed herein.

In an embodiment, a system is disclosed that may include a non-transitory memory that is coupled to one or more hardware processors. The memory may be configured to store at least instructions. The one or more processors may be configured to read the instructions from the non-transitory memory to cause the system to perform operations. The operations may comprise scanning, in a sandbox of a browser by a browser extension, at least part of a web page to produce a set of items of interests; transmitting, by the browser extension, the set of items of interests to a cloud-based enrichment and analysis of cybersecurity threat intelligence system to request information on the set of items; receiving, in the browser extension, a response from the cloud-based enrichment and analysis of cybersecurity threat intelligence system, the response including a scan result based on the transmitted set of items of interests, and the scan result including at least one of an indicator of compromise of the at least scanned part of the web page; and displaying, by the browser extension, the scan results including the at least one of an indicator of compromise.

In another embodiment, a system is disclosed that may include a non-transitory memory that is coupled to one or more hardware processors. The memory may be configured to store at least instructions. The one or more processors may be configured to read the instructions from the non-transitory memory to cause the system to perform operations. The operations may comprise receiving, in a sandbox of a browser by a browser extension, a selection of at least one particular indicator of compromise of the at least one of the indicator of compromise of at least scanned part of a web page; displaying, in the browser extension, one or more orchestrated responses to be performed on the selected at least one particular indicator of compromise; receiving, in the browser extension, a selection of at least one particular orchestrated response of the one or more orchestrated responses; transmitting, by the browser extension, the selected at least one particular orchestrated response to be performed on the selected at least one particular indicator of compromise to the cloud-based enrichment and analysis of cybersecurity threat intelligence system; receiving, in the browser extension from the cloud-based enrichment and analysis of cybersecurity threat intelligence system, a response including a result of the at least one particular orchestrated response; and displaying, in the browser extension, the result of the at least one particular orchestrated response.

In another embodiment, the aforementioned processes may be a method for implementing a browser extension for cyber threat intelligence and response In yet another an embodiment, the aforementioned processes may be implemented on a non-transitory computer readable medium having stored thereon computer readable instructions that are executable to cause one or more processors to perform the operations.

Further scope of applicability of the apparatuses and methods of the present disclosure will become apparent from the more detailed description given below. It should be understood that the following detailed description and specific examples, while indicating embodiments of the apparatus and methods, are given by way of illustration only, since various changes and modifications within the spirit and scope of the concepts disclosed herein will become apparent to those skilled in the art from the following detailed description.

DETAILED DESCRIPTION

Based upon the foregoing discussion, it may be advantageous to orchestrate a response to a security event when possible to free up qualified network security analysts for higher priority tasks related to previously unknown cybersecurity threats and improve overall response time to cybersecurity events. Orchestrating a response to a cybersecurity threat constitutes a transformation of key data associated with a threat into an effective action by processing the data in a way that generates a response according to predetermined parameters. One such approach is collecting a plurality of threat models, and storing the plurality of threat models for later use in scoring and classifying future threat models. The collected threat models may also be integrated and/or analyzed with other data feeds from external sources for analyzing and responding to new cybersecurity threats. Accordingly, it is desirable to provide a novel enrichment and analysis of cybersecurity threat intelligence system, which may be cloud-based, that accounts for and augments threat models based on prior threat models and external sources. A threat model may be generated from a process that assesses a risk of a cybersecurity threat. Such a process may include: (1) an indication of what is included/excluded from the analysis (e.g., scope), (2) collection of detailed data about real cyber incidents (e.g., malicious URLs, phishing attempts, etc.), (3) a risk assessment as to whether the existing defenses are sufficient to mitigate or prevent the threat and/or to what extent are users/systems vulnerable to the threat, and (4) an action may be undertaken to detect and/or mitigate the threat as assessed by parts 1-3 of the process.

Disclosed are techniques that can include a system for cloud-based enrichment and analysis of cybersecurity threat intelligence. In an embodiment, the system may assimilate, correlate, and/or assess various threat models and/or other data feeds to generate an aggregated understanding of one or more IOCs in a threat model, including, for example a threat rating, a confidence rating, and/or a context of the threat being assessed. The system may provide users with an understanding of an indicator's general reputation, specific risk to the organization of the user, and/or a relation to current or past threats. A user may refer the indicator to a network security analyst who is a cybersecurity expert—such as a network engineer or the like—who may oversee or manage security of a network and/or computing systems connected thereto. The user may also refer the indicator to an analyst, leadership, and management in fields such as Threat Intelligence, Incident Response, Risk Management, etc.

The system may collect individual instances of threat models, and provide such threat models based on cross-instance observations and false positive reporting from other threat models The system may be configured to store reputation data from multiple "data services" to be brokered to each threat model instance. This may improve efficiency of collection and storage, and may create a centralized repository for all observation, false positive data, external reputation data, and whitelist data from all threat model instances. The centralized data may also be used for analytics and/or definition of a reputation score.

The system may provide the capability and associated infrastructure for a "Universal Whitelist" and may enable many other analytics for cross-instance delivery in the future. For example, the system may aggregate observations and false positive ratios by the cybersecurity industry and/or other organizations.

For each threat, such as an IOC, a threat model may be generated, and actionable intelligence of the threat model may be enriched with a reputation, including good and/or bad data points, and background data. The reputation of the threat and background information of the threat, such as WHOIS data, a DNS history, may enable analysts to prioritize other threats and incidents related to the threat being analyzed.

The consolidation of cybersecurity intelligence data may provide a significant advantage to cybersecurity threat models. The consolidated data may be vetted by different customers and/or users of the system and may provide more useful and more relevant information about the threat. The centralized platform described above and below may also be scaled for long-term, high-volume storage needs. Customers and users of the platform may also benefit by being able to see information that was previously unknown or inaccessible. This can improve the quality of a threat model, which provides an opportunity to orchestrate an suitable cybersecurity response based on predetermined parameters, thereby reducing the need for analysts and improving response time. For example, the disclosed system may output a reputation score that can be used to deliver an appropriate response automatically.

Search/query/view metrics may be used on the analyzed data to gauge customer/user interactions with the platform to provide data driven decisions. Users may utilize these metrics to study the data to develop more detailed data points. These metrics may then be analyzed by the platform to provide even more contextual data. Further, customer/user feedback in terms of observations, confirmation/disputation, and social like/unlike may add another dimension to the analyzed data. For example, in some configurations, a machine learning algorithm or classifier may be applied to threat data and/or metrics.

Cloud-Based Enrichment and Analysis System

FIG. 1 is an example architecture for a system according to the embodiments disclosed herein. As shown in FIG. 1, a cloud-based enrichment and analysis system 110 may be operably connected to an application program interface (API) for the cloud 115. An API may refer to a set of routines, protocols, and/or tools for a software application. An API may specify how software components may interact. The cloud system 110 may receive, via the cloud API 115, known bad data feeds 120 from external data sources, known good data feeds 130 from external data sources, and enrichment data feeds 140 from external data sources.

A data feed may refer to receipt of data from a source by which the data can be updated in real-time. Known bad data feeds 120 may include, for example, a blacklist and/or a malicious uniform resource locator (URL) data feed. For example, a known bad data feed may be published online and provide a targeted collection of known malicious sites. Such known bad data feeds may be added via partnerships with other cybersecurity organizations, discovered via open source research, etc. Known good data feeds 130 and enrichment data feeds 140 may include, for example, a whitelist, Google's safe browsing site status list, and/or Alexa's top 1000 global sites list. Known good data feeds may be published online and provide a targeted collection of known benign indicators. The cloud-based enrichment and analysis system 110 may receive, via the API 115, threat models from one or more cybersecurity threat intelligence systems 150, which is operably connected to its own API 155. The cybersecurity threat intelligence system may provide a user with analytics regarding one or more threat models, data from the data feeds, data pertaining to IOCs, current and/or previous trigger events, an indication of threats for the user's organization, an interface for a user to configure an orchestrated response to one or more threats, an indication of attack patterns of cybersecurity threats, etc. The API 155 of the cybersecurity threat intelligence system may also receive the known bad data feeds 120 received by the cloud-based enrichment and analysis system. For example, the cloud-based enrichment and analysis system 110 may transmit a reputation score to the cybersecurity threat intelligence system 150 as a part of a threat model.

As discussed below, a trigger event may include one or more of a new email in an email inbox, an HTTP request, a Representational State Transfer (REST) API Endpoint, closing a task, and/or a customized trigger event. Based on the occurrence of the trigger event, a SIEM system and/or server may orchestrate a response to the trigger event that provides analysis of security alerts to be used by an end user network security analyst.

As mentioned above, a trigger event may also be customized and may be based on an app service. Customized network security trigger events may be designed and/or built by system users/administrators and/or selected by system users/administrators via a trigger event catalog. The app service may be an application that was built to serve as a customized network security trigger event that is run on a server. Once the application is built to serve as a customized trigger event, the application serving as the customized trigger event may run one or more servers, and the one or more servers may be a separate server and/or may be a Playbook server (discussed below). The server on which the application runs may be determined for each customized trigger event. An app service may publish information and/or metrics about the application running, such a server memory and/or CPU usage, errors, hits, misses, and/or active responses, such as active Playbooks. Additionally, a current app service may maintain logs and data collected by the app service between restarts of the application.

A customized trigger event may be a custom trigger service that may receive a push type event over a custom protocol, raw port access, or poll on a configured schedule, such as a Syslog UDP listener, a Microsoft Graph API, a Twitter Stream Subscriber, etc. Additionally, a customized trigger event may be a Web Hook service that may receive a push type event that may include complex data that requires normalization or filtering, such as a Splunk CIM Trigger, Pager Duty Alert Trigger, Slack Event Trigger, etc. Further, a customized trigger event may be an API service in which a pull type service where custom APIs may be built for third-party integrations, such as a TAXII Server, Custom API Extensions, etc. Further, for each type of custom trigger service, output variables of the custom trigger service may be customized. These output variables of a custom trigger service may be provided as input to a Playbook and/or provided to other custom trigger services.

As discussed in more detail below, a customized trigger event may include one or more of a custom trigger service, a Web Hook service, and/or an API service. Customized trigger events allow users of the SIEM system and/or server to develop focused targets to determine a response to a cybersecurity threat or event, such as a ransomware attack, code exploit, distributed denial of service attack, malware, and the like. In other words, customized trigger events allows for data generated by third-party applications and services to be integrated more seamlessly into the SIEM system and/or server.

Figure 2:
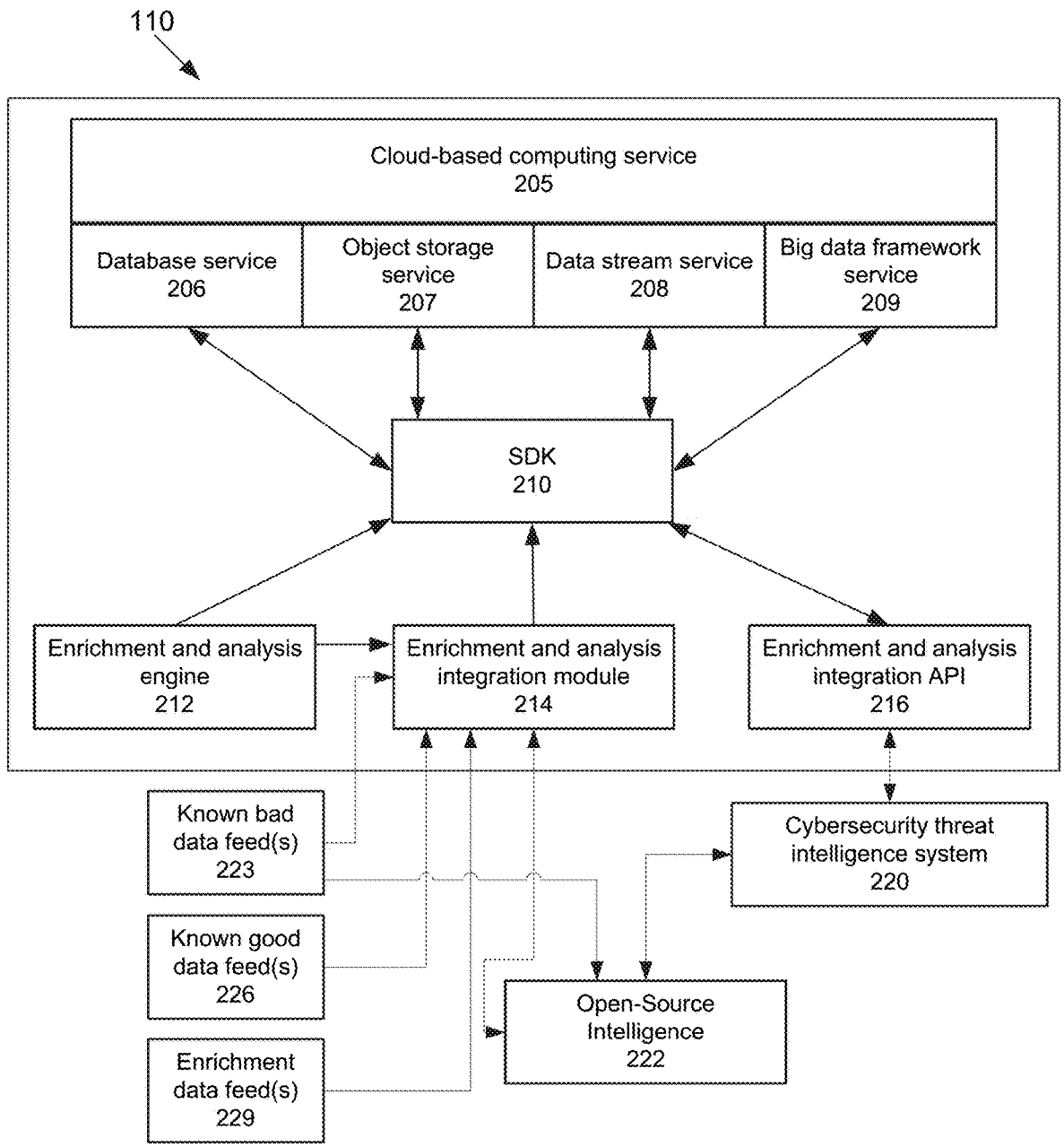
FIG. 2 is an example of the cloud-based enrichment and analysis system according to an embodiments disclosed herein.

FIG. 2 is an example of the cloud-based enrichment and analysis system according to an embodiment disclosed herein. The cloud-based enrichment and analysis system 110 may include various modules that may be operably connected to one another or to external sources by an API. A cloud-based computing service 205, such as Amazon Web Services (AWS), may refer to a virtual cluster of computers that have high availability (e.g., available all the time) through the Internet and that have attributes of a real computer including a central processing unit (CPU) or processor, graphical processing unit (GPU), random-access memory (RAM), machine readable storage, an operating system, one or more applications, etc. The cloud-based computing service 205 may include a database service 206, such as Amazon DynamoDB, which can provide a service based upon throughput rather than a storage amount. The database service 206 can allow information to be more accessible for retrieval patterns of end users. The cloud-based computing service 205 may include an object storage service 207, such as Amazon S3, which can refer to storage provided through a web service, and which can provide interoperability between computer systems on the Internet. The cloud-based computing service 205 may include a data stream service 208, such as Amazon Kinesis, which may refer to an intake of data in real-time such as application logs, website clickstreams, etc. into a database. The data received may be processed and analyzed in real time. For example, streaming data can be analyzed. The object storage service 207 and the data stream service may manage transmission of data between the big data framework service 209 and the database service 206 via the SDK 210. The cloud-based computing service 205 may include a big data framework service 209, such as Amazon Elastic Map Reduce, which may provide a framework for distributed processing of large data sets across clusters of computers. The big data framework service 209 may run, for example, at certain time periods, and conduct operations, such as Map Reduce, and store the processed data feeds in the database service.

A cloud-based enrichment and analysis software development kit (SDK) 210, may refer to a set of software development tools that allows the creation of applications for a certain software package, framework, hardware platform, computer system, etc. The SDK 210 may be operably connected to one or more of the cloud-based computing service 205, a cloud-based enrichment and analysis engine 212, and/or a cloud-based enrichment and analysis integration module 214, via an API. The SDK 210 may be operably connected to a cloud-based enrichment and analysis API 216. The SDK 210 may utilize a common codebase and may be provided in any programming language such as Java, Scala, C#, etc. The cloud-based enrichment and analysis integration module 214 may normalize and/or standardize disparate formats so that the cloud-based enrichment and analysis engine 212 can make statements via the API 216. The statements may include, for example, analytics, a threat model, a reputation score, etc., which can be provided or displayed to a user via the cybersecurity threat intelligence system 220.

The cloud-based enrichment and analysis system 110 may receive and/or transmit one or more threat models and/or metadata (e.g., data information, information about sources, etc.) that inform decision making (e.g., whether to deprecate the data, trust level, etc.) from/to one or more of a cybersecurity threat intelligence system 220, which is operably connected to open-source intelligence 222, via the API of the cloud-based enrichment and analysis system 216. A modified threat model may be sent to the cybersecurity threat intelligence system 220 as well. The cloud-based enrichment and analysis system 110 may receive known bad data feeds 223 from external data sources, known good data feeds 226 from external data sources, and enrichment data feeds 229 from external data sources, via the cloud-based enrichment and analysis integration module 214. The API, such as API 155, of the cybersecurity threat intelligence system may also receive the known bad data feeds received by the cloud-based enrichment and analysis system.

Figure 3:
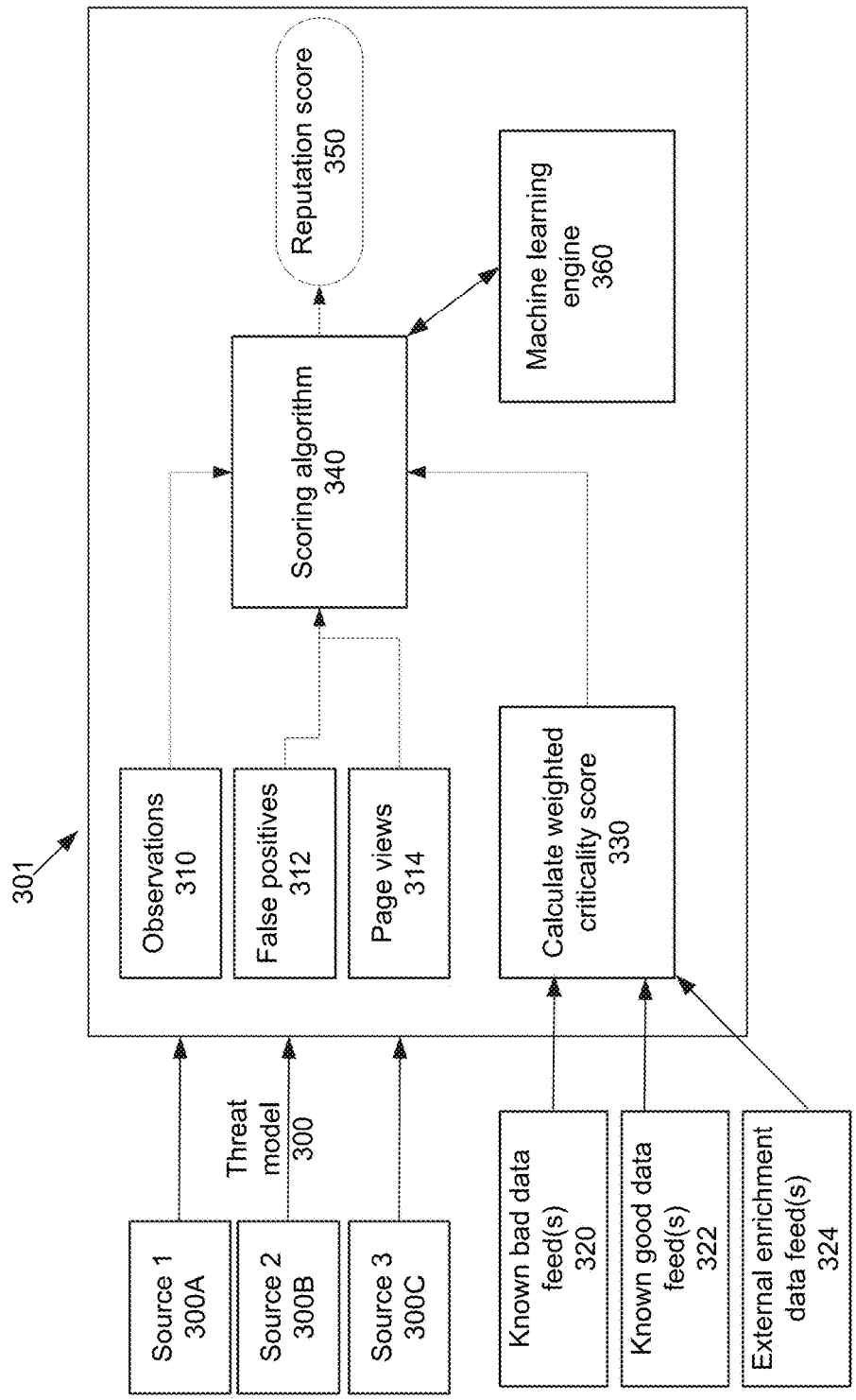
FIG. 3 shows an example configuration of different data sources and processing thereof by the system according to embodiments of the present disclosure.

FIG. 3 shows an example configuration of different data sources and processing thereof by the system according to embodiments of the present disclosure. A threat model 300 pertaining to a specific threat may be received into the cloud-based enrichment and analysis system 301, for example, by the cybersecurity threat intelligence system. Upon receiving the threat model 300, the cloud-based enrichment and analysis system 301 may assess the threat based on one or more of observations 310, false positives 312, and page views 314 related to the threat. Observations 310 may refer to how often the threat has been observed in the past, and the timeliness of the observation. False positives 312 may refer to a threat that is benign or expected behavior that has been identified as anomalous or malicious. For example, an innocuous indicator such as "google.com" may be incorrectly identified as malicious. It may be indicated as a false positive by a user of the system. Page views 314 may refer to how often users of the cloud-based enrichment and analysis system 301 view the threat. For example, a threat model may be received that identifies a threat that has been previously identified and for which the system has at least some data about the threat (e.g., observations, false positives, page views, a reputation score, etc.). The new threat model may be analyzed based upon the observation, false positive, and page view data for the threat, and any additional information from the new threat model may be utilized to update the system. In the event that the threat model pertains to a brand new threat (i.e., the system has no information about the threat), then default values and coefficients may be utilized in the algorithm to convey to a user that the system is aware of and/or monitoring the threat. As additional information about the new threat is accumulated, the system may be updated.

For example, individual threat models 300 may refer to a given threat and be obtained from a variety of different sources 300A, 300B, 300C. At a specified frequency (e.g., every day, every 12 hours, beginning at 8:00 AM GMT daily, etc.), individual threat models 300 that have been collected by the system 301 may be analyzed based upon at least the observations 310, false positives 312, and/or page views 314. The system 301 may specify a variety of IOCs such as a file hash, IP address, domain, URL, email address, etc. and a configurable number of days in which such information about the indicator may be utilized in analysis. For example, there may be an observation cut-off of 500 days for considering a file hash indicator for the observation and false positive information, but the cut-off may be 100 days for the page view information. The system 301 may also have a default value for IOCs that are new or that do not otherwise have a specified cut-off. Each indicator may have a different cut-off specified, and each cut-off may be different for the observation 310, false positive 312, and page view data 314. Table 1 provides an example of the cut-offs for each type of information for each indicator. There may be many more indicators than the ones identified in Table 1, and not all of the indicators in Table 1 need to be used.

TABLE 1

| IOC | Observations cut-off (days) | False positive cut-off (days) | Page view cut-off (days) |
|---|---|---|---|
| File hash | 500 | 500 | 100 |
| IP address | 10 | 10 | 10 |
| Domain | 10 | 50 | 100 |
| URL | 100 | 100 | 100 |
| Email address | 100 | 75 | 100 |
| Default | 7 | 7 | 7 |

The disclosed system may also receive information about known bad feeds 120, 223, 320, known good feeds 130, 226, 322, and external enrichment sources 140, 229, 324 as described earlier. With regard to known bad data feeds 120, 223, 320, there may be an associated default threat rating and confidence values for each feed, which may be determined based upon analyst judgment and mathematical validation against known ground truth datasets. In some instances, a data feed may provide a threat rating and/or confidence equivalent that may be used if it is available. Similarly, the dates upon which a bad data feed 320 was uploaded/re-uploaded may be stored in the system 301 and have an associated cut-off time after which the data are no longer considered for analysis similar to the IOCs based upon the threat models shown in Table 1. Each source of a known bad data feed 320 may be assigned a trust level, which could be on a scale of 0 to 10, for example. Trust level may be determined based on analyst judgment and mathematical validation. Each known bad data feed source 320 may be assigned two parameters for confidence deprecation as disclosed herein. If a source has multiple IOCs, then these values can be assigned per IOC.

An IOC's confidence rating may be computed to deprecate over time (e.g., with each day, each hour, or other specified time period/frequency) since its last update. This may occur for each IOC and per the source. A deprecated confidence value may be the initial confidence value multiplied by the deprecation factor (df). The initial confidence value may refer to the value that was assigned to the IOC when it was last updated. For each passing unit of time (e.g., day, hour, etc.) when the IOC has not been updated, the confidence value from the last updated point may be utilized instead of the previous unit of time's value (e.g., day, hour, etc.). A deprecation factor, df, may be computed by the following formula:

$$df = \frac{1}{1 + e^{-\alpha(M+1-x-\beta)}}$$ Formula 1

In the above formula, α may refer to the deprecation rate, which can be configured in the system such as being defined by analyst judgment and mathematical validation. A lower deprecation rate (e.g., 0 or 1 being low) may cause faster deprecation. β may refer to the deprecation range (e.g., 0 or 1 being low), which can be configured in the system. It can be computed as the difference between the minimum and maximum values for the range. Thus, a higher value for deprecation range may be indicative of a larger range. The time cut-off number, M, can refer to the specified unit of time measurement (e.g., weeks, days, hours, etc.) after which the deprecated confidence is set to zero. The term χ may refer to the difference between the current unit of time measurement (e.g., the current day, current hour, etc.) and the amount of time since the last update measured in the same units (e.g., days, hours, etc.). According to Formula 1, if χ>M, then df is 0, which indicates that the confidence in the specified IOC is zero. If χ is not 0, then df is computed as 1, which means the IOC should not be deprecated. The deprecation factor may be computed for the known bad data sources 320.

As stated above, the deprecation factor can be per source or per IOC type. Formula 1 can be flexible to allow fast deprecation of ephemeral IOCs (e.g., a file hash), and slow or no deprecation of stable IOCs (e.g., a domain). Table 2 provides examples of default values that may be assigned for various IOCs. Other values may be used and may be configured to suit a particular user's desired level of security. As above, the default value may be utilized where an IOC is new or otherwise does not specify some or all of the parameters (e.g., α, β, and/or M).

TABLE 2

| IOC | A | P | M |
|---|---|---|---|
| File hash | Do not deprecate | Do not deprecate | Do not deprecate |
| IP address | 0.5 | 0.7 | 7 |
| Domain | 0.8 | 0.3 | 30 |
| URL | 0.8 | 0.3 | 30 |
| Email address | 0.8 | 0.3 | 30 |
| Default | 0.5 | 0.5 | 7 |

As illustrated in FIG. 3, the external sources may also include known good feeds 322. For certain IOCs, the criticality score as disclosed below, may be set to zero. For example, any or all of the IOCs shown in Table 2 may be set to zero for known good data feeds 322. Thus, if an IOC is completely deprecated or is a good known good indicator, then it may receive a value of 0, which may effectively remove it from consideration by the weighted criticality score algorithm disclosed herein. In some instances, an IOC may be somewhat deprecated, but not completely deprecated. Such a value can be utilized in Formula 2 below.

The external enrichment data 324 may not receive a score, as it may not be inherently good or bad. For example, external enrichment data may contain information that a particular IOC is a part of the Amazon EC2 cloud hosting infrastructure. The external enrichment data may not be inherently good or bad but may be useful to help resolve whether an unknown indicator should be considered good or bad. The external enrichment data may be utilized to modulate the reputation score in the scoring algorithm 340, as well as the criticality score, as determined by the inference ruleset engine 660 (e.g., FIG. 6). For example, the reputation score may be decremented slightly, but not to zero, for an IOC that is known to exist in Amazon's hosting environment because the IOC is largely less benign than other hosting options for adversaries.

The calculated weighted criticality score 330, according to Formula 2, may be computed for a given IOC per source. As stated above, IOCs that are a part of known good data feeds 322 may receive a score of zero. For each known bad data feed 320, the confidence may be deprecated as disclosed earlier based upon the deprecation parameters of the specific source for each IOC type as described with regard to computation of the deprecated confidence value. The threat rating and the deprecated confidence value may be used to determine the IOC's criticality score per source. The criticality score may refer to a value that conveys the severity of a threat of a particular indicator based upon its innate nature. For example, the criticality score may have a predefined range of 0-650 (other suitable ranges may be utilized) and a severe threat such as ransomware may receive a value of 650 while a known good indicator may receive a score of 0. Thus, the criticality score may be computed by mapping the threat rating and deprecated confidence through a nonlinear mathematical function. A weighted criticality score $CS_W$ for each IOC may be computed as disclosed in Formula 2:

$$CS_W = \frac{\sum_{i=1}^{N} CS_i * STL_i}{\sum_{i=1}^{N} STL_i} \quad \text{Formula 2}$$

In Formula 2, N may refer to the total number of sources, $CS_i$ may refer to the criticality score of the IOC source, i, $STL_i$ may refer to the trust level of source i. For example, an IOC for A may have two different sources, s1 and s2. For the first source, $CS_i$ may be 2 and $STL_i$ may be 6. For s2, $CS_i$ may be −1 and $STL_i$ may be 2. Thus, $CS_w$ for both sources for IOC A may be computed as ((2*6)+(−1*2))/(6+2). Each new source may have a trust level in a range of, for example, at least 1 (least trusted) to at most 10 (fully trusted).

Figure 4:
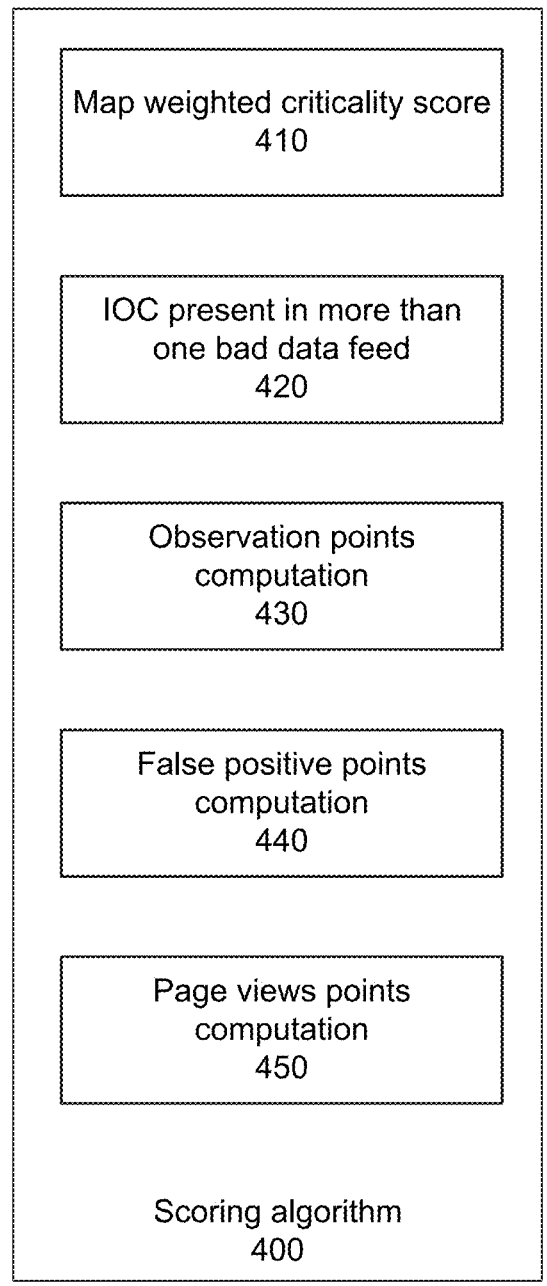
FIG. 4 is an example of the processes performed by the scoring algorithm according to an embodiments disclosed herein.

A scoring algorithm may assimilate the weighted criticality score with the information obtained from the threat models (e.g., 310, 312, 314). FIG. 4 is an example of the processes performed by the scoring algorithm according to an embodiment disclosed herein. The weighted criticality score for each IOC may be scaled or mapped to a particular range at 410. For example, a score of −2 may be mapped or scaled to zero, a score of −1 may be mapped or scaled to a value of 100, a score of 0 may be mapped or scaled to a value of 250, a score of 1 may be mapped or scaled to a value of 400, a score of 2 may be mapped or scaled to a value of 650. An IOC that is not in the known bad data feeds 320, may be assigned a default value such as 250 (e.g., unknown). The mapping may be configurable such that the values may be different than those mentioned specifically here, and additional values may be incorporated or removed from the mapping. The scoring algorithm may determine at 420 whether an IOC is present in more than one bad data feed 320. If so, the algorithm may add a value to the total score such as an additional 100 points. The threat model data that were received via 310, 312, 314 may also be analyzed by the algorithm. The number of points awarded based upon the observations, false positives, and page views may be computed as follows:

$\log_{10}$(number of observations since the cut-off date+1)*100 Formula 3

$\log_{10}$(number of false positives since the cut-off date+1)*100 Formula 4

$\log_{10}$(number of page views since the cut-off date+1)*100 Formula 5

The number of points based upon Formulas 3-5 may have each have an upper limit such as 500, 250, or 50. Similarly, there may be a maximum number of points for the weighted criticality score such as 650. The scoring algorithm 340 may then sum the points awarded for the weighted criticality, an IOC being in multiple bad data feeds, and Formulas 3-5 to obtain an aggregated score. The reputation score 350 may be computed as (the aggregated score*1000)/the maximum aggregated score. The maximum aggregated score may be the sum of the maximum number of points awarded in Formulas 3-5, plus the award for being present in multiple bad data feeds, and the maximum criticality points. Thus, the reputation score may be scaled between 0 and 1000. The disclosed embodiments are not limited to this particular scale. In view of the foregoing scales, the closer to zero that a reputation score is, the more reputable or credible the threat may be considered. But an inverted scale where a score closer to zero indicates less reputable or greater threat may also be used. The reputation score for the threat may be provided to a user of the cloud-based enrichment and analysis system. For example, a user may interface with an API of the system using a computing device (e.g., laptop, tablet, etc.) and request a computation of the reputation score for a threat. The system may return an indication of the reputation score, as well as other information related to the reputation score including, but not limited to, the received threat models, page views, false positive, observations, known good and bad data feeds, external enrichment data, etc. The reputation score may be a component of a modified threat model, along with other information that can display to a user the aggregated data for a given threat. The modified threat model may be sent to users of the system or displayed to users via the cloud-based system.

Figure 5A:
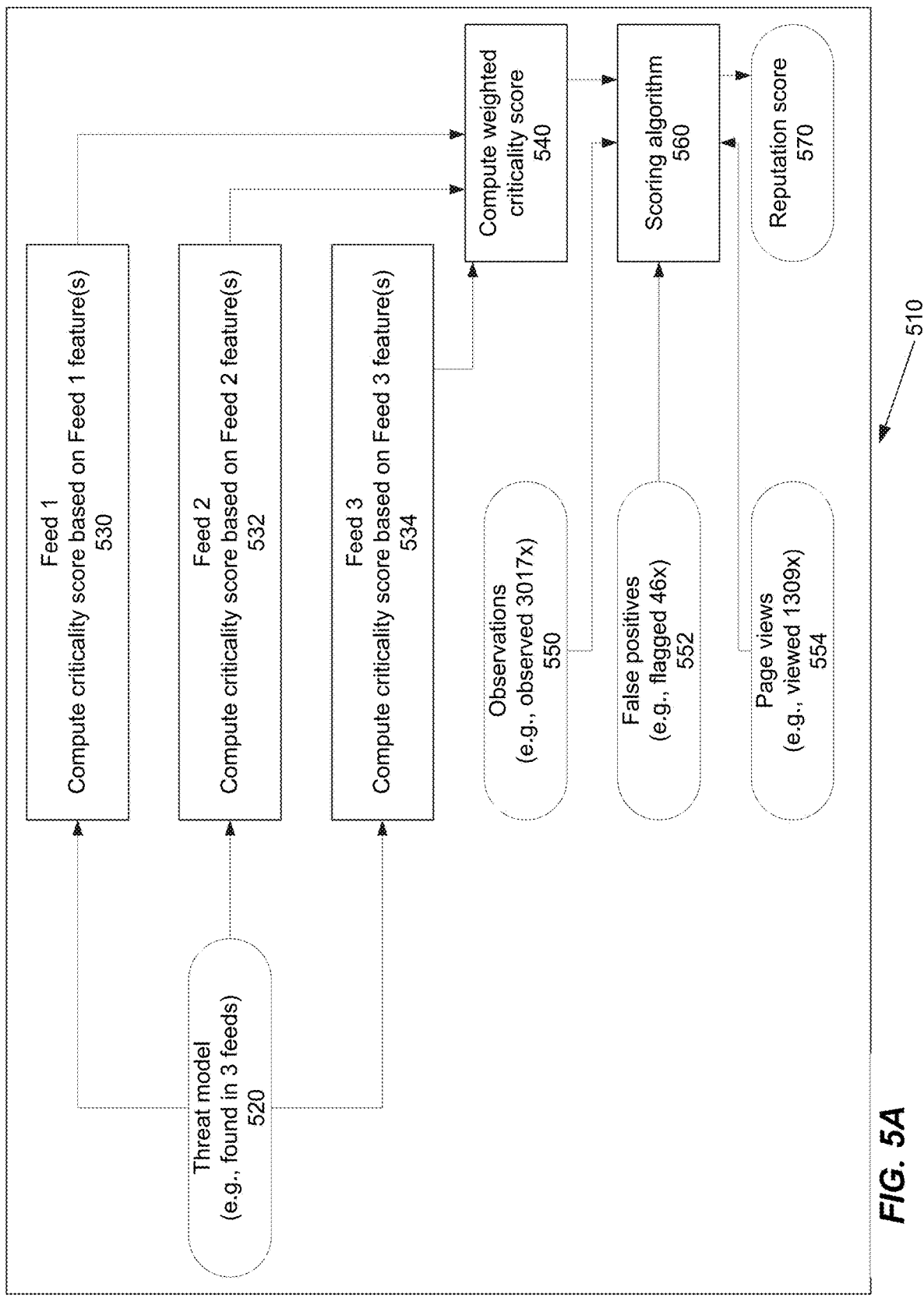
FIG. 5A illustrates an example of a reputation score based upon previously assessed threats and data feeds from external data sources using a method for enrichment and analysis of cybersecurity threat intelligence, according to embodiments of the present disclosure.

FIG. 5A illustrates an example of a reputation score based upon previously assessed threats and data feeds from external data sources using a method for enrichment and analysis of cybersecurity threat intelligence, according to embodiments of the present disclosure. In the exemplary embodiment, a threat may be assessed by the cloud-based enrichment and analysis system 510. The threat in the exemplary embodiment may be identified in a threat model 520 that is detected in three bad data feeds 530, 532, 534, which can provide information on known bad data as described earlier. For each of the data feeds 530, 532, 534 in which the threat has been found, a criticality score may be calculated based on a feature associated with each data feed 530, 532, 534 and the threat being assessed. A combined weighted criticality score 540 may be calculated based on each of the data feed criticality scores in which the threat is assessed. For example, the combined weighted criticality score may be 601 for the threat being assessed. The combined weighted criticality score 540 may then be scored with a scoring algorithm 560 as described earlier, along with one or more of observations 550, false positives 552, and page views 556, as described above, related to the threat being assessed. Continuing this example, the threat may have been observed 3,017 times, flagged as a false positive 46 times, and viewed 1,309 times. With the combined weighted criticality score 540, as well as the one or more of observations 550, false positives 552, and page views 554 related to the threat, a scoring algorithm 560 may be used to compute a reputation score 570 of the threat. In this example, the maximum aggregated score is 1550 based upon maximum thresholds of 650 for the mapped criticality score, 100 points for the IOC being present in multiple feeds, 500 points for the observations, 250 points for the false positives, and 50 points for the page views. The computed value for observations is $\log_{10}(3017+1)*100$ (or 348); for false positives is $\log_{10}(46+1)*50$ (or 83.6); and for page views $\log_{10}(1309+1)*10$ (or 31.2). When these values are summed with the 100 points for the threat being present in multiple feeds, as well as the computed weighted criticality score value of 601, the value is 1163. The reputation score 570 can be computed as (1163*1000)/1550 or approximately 750.

Figure 5B:
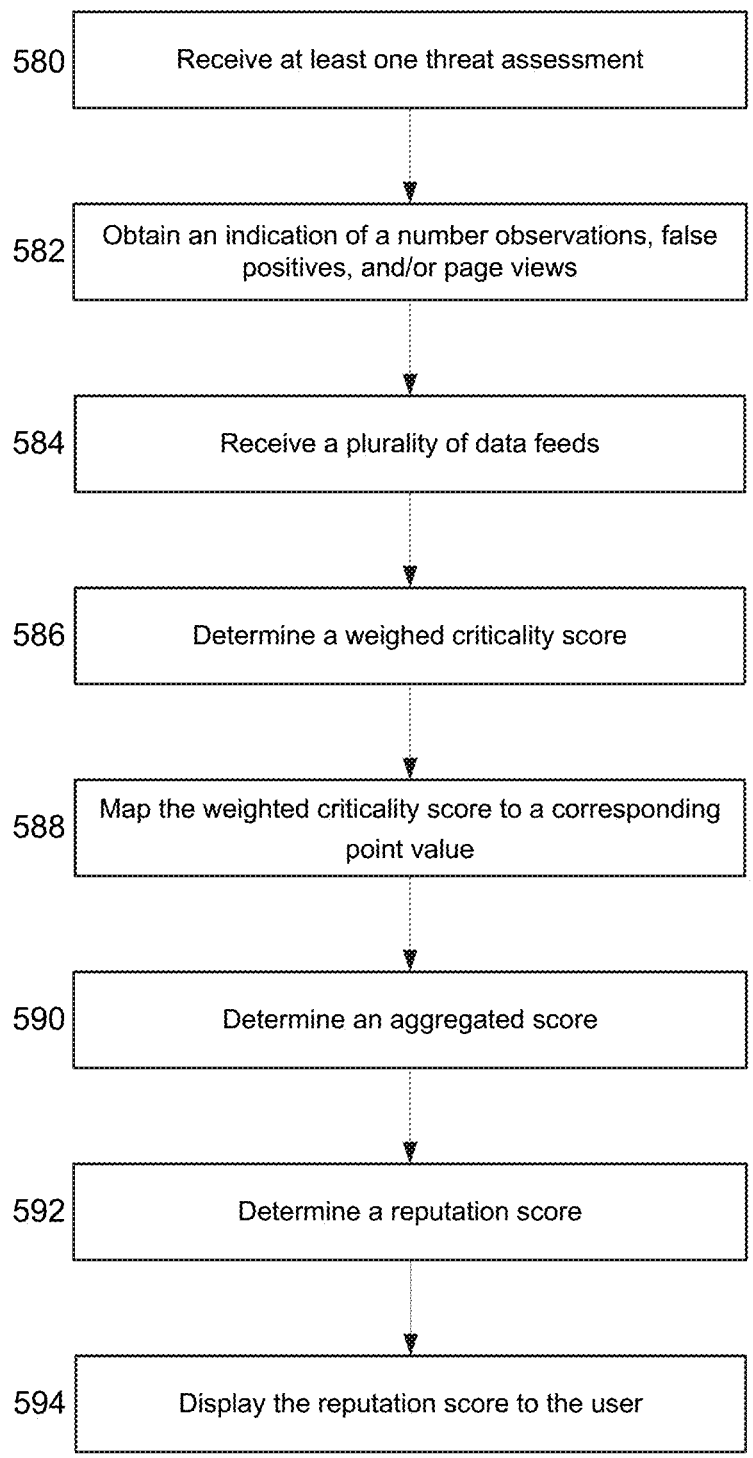
FIG. 5B is an example of the processes performed to obtain a reputation score according to embodiments disclosed herein.

FIG. 5B is an example of the processes performed to obtain a reputation score according to embodiments disclosed herein. At 580, at least one threat model which identifies a cybersecurity threat may be received over a communications network. The communication network may refer to the Internet, for example. As disclosed above, the threat model may identify a cybersecurity threat. At 582, an indication of a number of observations, a number of false positives, and a number of page views for the cybersecurity threat identified in the at least one threat model may be obtained. For example, in FIG. 4A, there were 1309 page views for the threat at 554. One or more data feeds may be received over the communication network at 584. As described earlier, the data feeds may include one or more of a known bad data feed that constitute known cybersecurity threats, one or more known good data feed that do not constitute known cybersecurity threats, and one or more enrichment data feeds. The data feeds may include one or more IOCs. For each IOC, a weighted criticality score may be computed at 586. This score may be computed as described earlier with regard to Formula 2. The weighted criticality score may be mapped to a corresponding point value at 588. For example, the weighted criticality score may return integers on a scale of −5 to 5, including 0. For each integer, a corresponding point value may be assigned. A weighted criticality of −1 may be assigned 300 points and while 1 may be assigned 450 points. An aggregated score that includes at least the corresponding point value may be determined at 590. As described above, points may be accumulated based upon the weighted criticality score, whether an IOC is present in multiple data feeds, and the number of instances for one or more of the observations, false positives, and page views. A reputation score may be computed at 592 as the product of a scale factor and the aggregated score, divided by a maximum point total. The reputation score may be provided to a user at 594 in response to a request, or displayed as a part of a dashboard that is provided when the user logs into the system to review threat models/cybersecurity threats.

Figure 6:
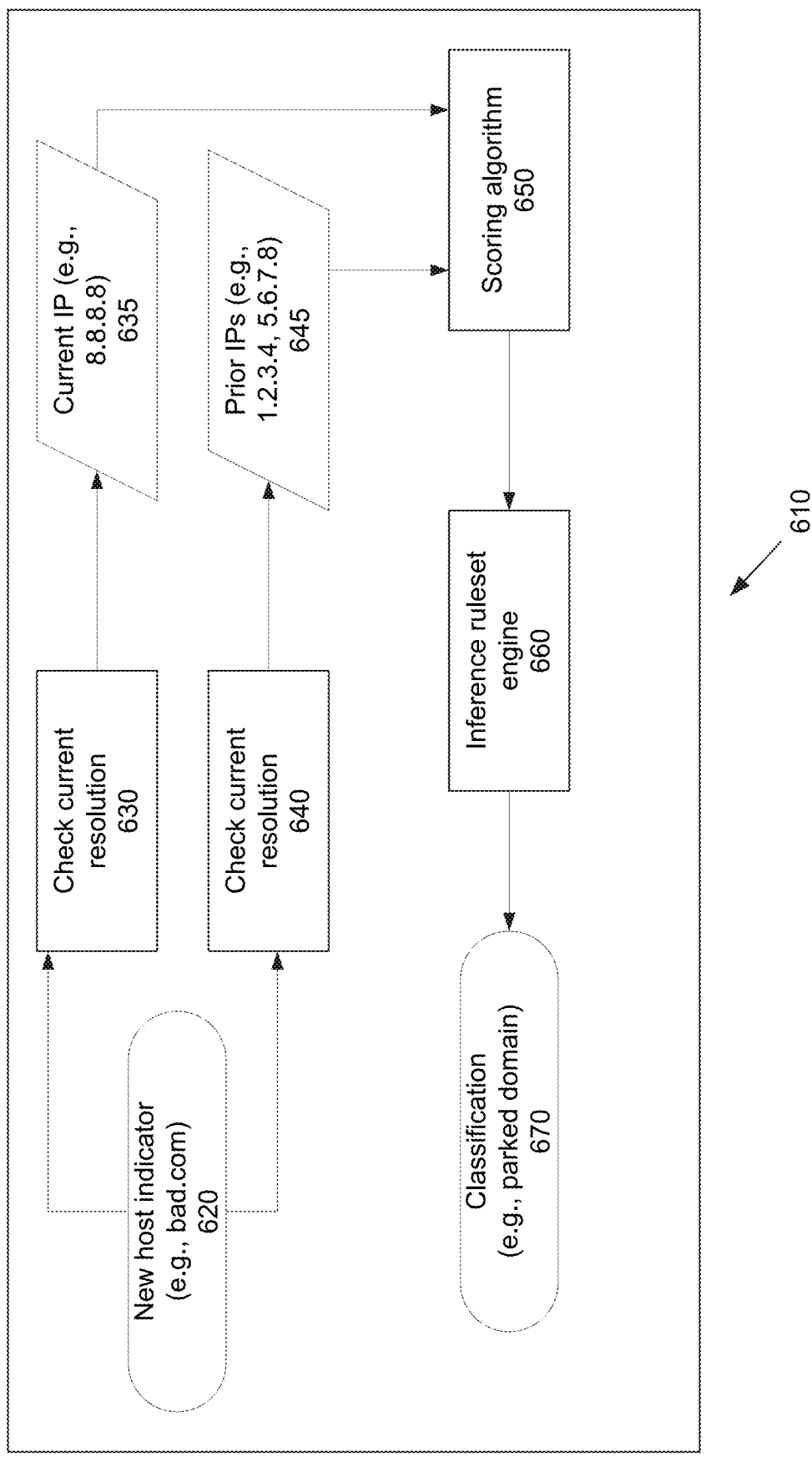
FIG. 6 illustrates an example classification of a threat based on previously assessed threats and data feeds from external data sources using a method for enrichment and analysis of cybersecurity threat intelligence, according to embodiments of the present disclosure.

FIG. 6 illustrates an example classification of a threat based on previously assessed threats and data feeds from external data sources using a method for enrichment and analysis of cybersecurity threat intelligence, according to embodiments of the present disclosure. In the exemplary embodiment, a threat may be classified by the cloud-based enrichment and analysis system 610. The current resolution of IP address for the URL received from the host indicator 620 may be determined at 630 such as by querying a server of a domain name system or obtaining the resolution from a third party service that maintains such information. The threat, in this example, may have a URL of "bad.com", and it may be classified using the cloud-based enrichment and analysis system 610. For example, the URL bad.com may be resolved to a currently mapped IP address, which may be 8.8.8.8 at 635. The historical resolutions of the URL bad.com may also be determined at 640. In this example, the URL may be historically mapped IP addresses 1.2.3.4, 5.6.7.8, etc. at 645. The classification/scoring algorithm 650 may then classify the currently mapped IP address, and separately, the historically mapped IP addresses. The currently mapped IP address may be classified as a good IP address and the historically mapped IP addressed may be classified as bad IP addresses. For each of the classifications of the currently mapped IP address and the historically mapped IP addresses, the cloud-based enrichment and analysis system 610 may apply an inference ruleset engine 660, which may be based on machine learning/language processing and other previous threat models. For example, a classifier may be trained on a data set that includes known good or known bad indicators. As a part of the training, features associated with good or bad indicators may be extracted and applied to new indicators to classify the indicator as a good or bad indicator. The inference ruleset engine may then determine that the URL bad.com is currently a parked domain at a good IP address. The classification algorithm may also determine that the URL bad.com is a temporarily using a good IP address at 670.

In some configurations, the reputation score may provide a basis for an orchestrated response as described below. For example, in the event that the reputation score is a above a certain threshold or in a predetermined range, it may generate an alert for an analyst (e.g., an email, text, automated telephone message, etc.) that the threat requires the analyst's attention. The Playbook that corresponds to the orchestrated response may pause in such instances. In some instances, the reputation score may be within a specified range for which the system may be configured to automatically take action(s) corresponding to the orchestrated response for handling threats.

Playbook

As described earlier, it may be advantageous to orchestrate a response to a security threat when possible to allow a network security analyst to concentrate on higher priority tasks related to previously unknown cybersecurity threats, and improve overall response time to such threats. As disclosed herein, a threat "Playbook" may be used. The Playbook may codify a particular network's security plan and automatically set a given response for a particular threat type and value. The Playbook can also integrate a number of applications for analyzing and responding to cybersecurity threats. A Playbook can be limited where (1) it does not have appropriate access to a wide array of threat intelligence sources, and (2) it has an inability to respond to alerts that are unknown, requiring the intervention of a network security analyst. The latter deficiency can be particularly damaging for zero day attacks that are undocumented in other threat intelligence sources. Accordingly, it is desirable to provide a novel SIEM system that accounts for and augments a Playbook's capabilities.

By automating security responses and updates based upon the reputation score and/or other threat intelligence information provided/analyzed by the above system, the orchestrated process disclosed herein can leverage existing threat intelligence integrated with security products, while at the same time preserving the limited resources of expert network security analysts. This combination improves the response time to growing cybersecurity threats with the same resources and collects and stores data as new threats are validated to further improve security processes. For example, if only one threat intelligence source has data on a particular malicious host, all other sources integrated with the orchestrated process could be updated with the new threat to improve the overall cybersecurity response.

Figure 7A:
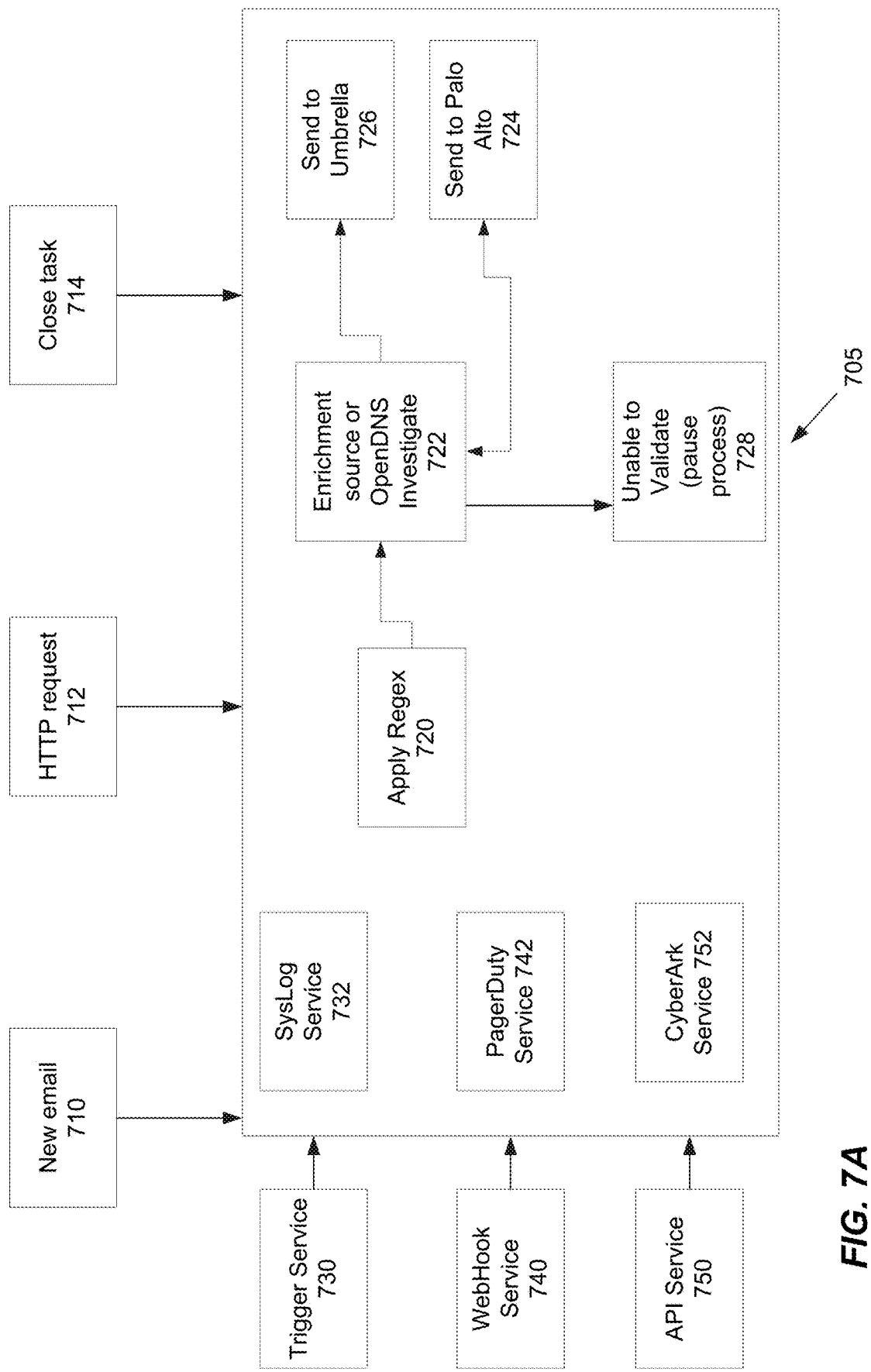
FIGS. 7A & 7B illustrate example overviews of a schematic for orchestrating a response to a cybersecurity threat event as disclosed herein.

FIG. 7A illustrates an example overview of a schematic for orchestrating a response to a cybersecurity threat event as disclosed herein. A network administrator can configure the threat event that will trigger execution of the orchestrated cybersecurity response. Examples of a threat event can be a new email 710, an HTTP request 712, closing a task 714, a trigger service 730, a WebHook service 740, and/or an API service 750. The orchestrated SIEM system 705 disclosed herein can include applying a RegEx ("Regular Expression") filter 720 to parse text and pull out identifying information from which a particular security threat may be assessed. In the case of email or an HTTP request 712, for example, domain or host names may be extracted for analysis. The extracted data can then be compared or analyzed using known repositories or sources of cybersecurity threat intelligence such as an enrichment source and/or OpenDNS Investigate 722 to determine whether the host is malicious or otherwise poses an unacceptable security risk. For example, a reputation score may be considered an enrichment source, and may provide an indication of whether an indicator is malicious. One or more such sources of intelligence regarding cybersecurity threats can be used in the orchestrated process.

As shown in FIG. 7A, if the host is confirmed or validated as a threat, for example based upon the reputation score computed as described earlier is within a range indicating that it is a confirmed threat and/or analyzed by OpenDNS Investigate, the orchestrated process can automatically send the host to a number of security defense applications according to the desired Playbook, such as a firewall or security-service that pushes out a security update to all devices in the network regarding the threat. Examples of such defense applications are firewalls from Palo Alto Networks 724 and the cloud-based network security service such as Umbrella from OpenDNS or the like 726. The validation of a threat can also be used to update sources of intelligence regarding cybersecurity threats to make the orchestrated process more efficient and improve automated responses to cybersecurity threats.

If the enrichment source and/or OpenDNS Investigate 722 or other threat intelligence product cannot validate 728 the threat, the orchestrated process is paused so that a network security analyst can assess the threat independently. The system may, for example, send an alert or notice (e.g., an email, text, etc.) to the analyst. If the analyst validates the threat, the host may then be processed in the same orchestrated manner by updating threat intelligence sources and implementing the security response as is done when the threat is automatically determined based on prior threat intelligence. Previously, analysts may have been informed about unknown hosts with an alert or email creating a task order. But in the previous conventional SIEM systems, the task was no longer within the response process of the SIEM system and the determination could not be seamlessly integrated into the network defense application. As disclosed herein, the network security analyst's validation of a cyber-security threat may be processed according to the Playbook and cause an automated or orchestrated network security response.

Figure 7B:
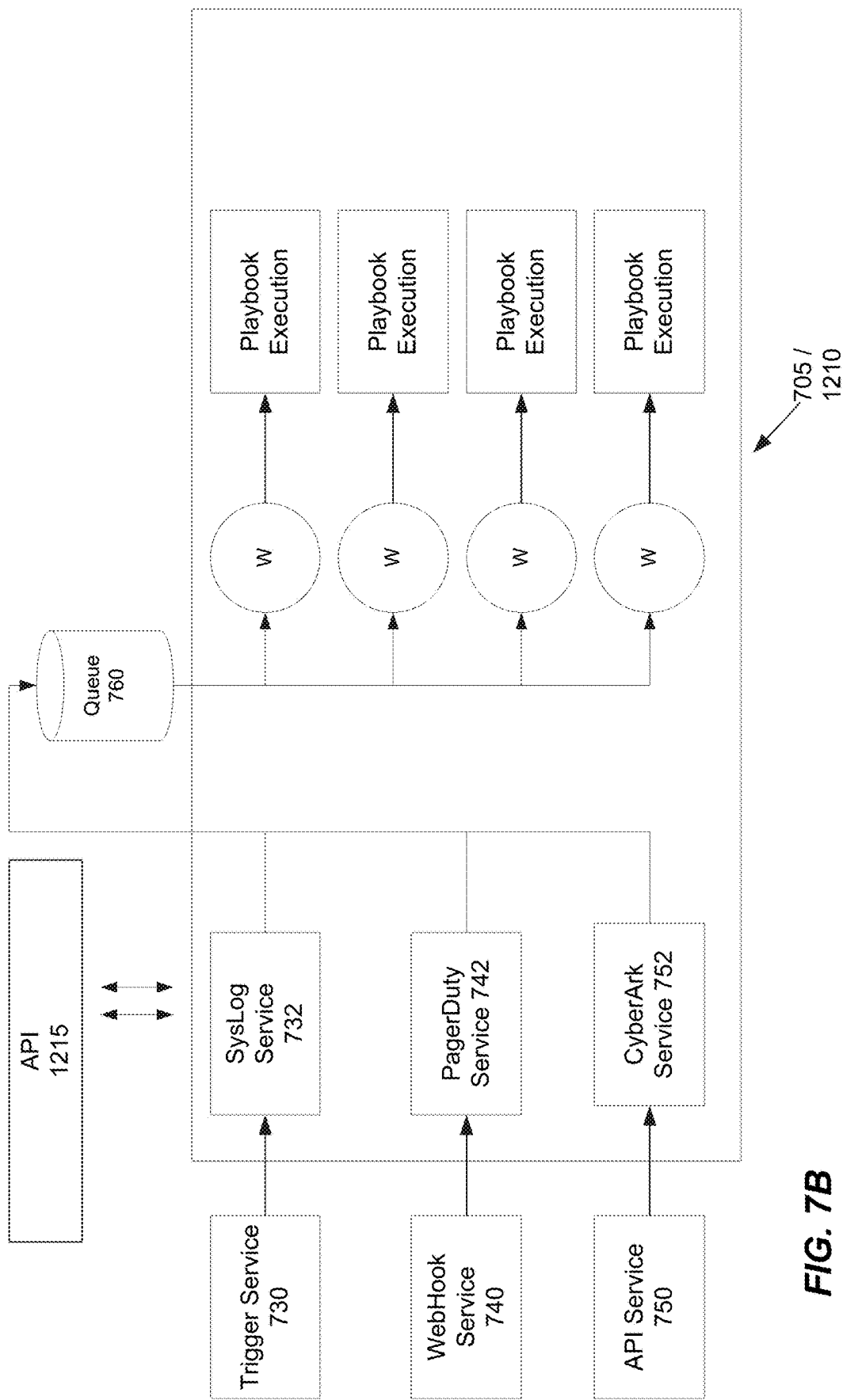

FIG. 7B illustrates an example overview of a schematic for orchestrating a response to a cybersecurity threat event as disclosed herein. A network administrator may configure a customized trigger event that will trigger execution of the orchestrated cybersecurity response. An example of a customized trigger event may be a custom trigger service, such as trigger service 730, that may receive a push type event over a custom protocol, raw port access, or poll on a configured schedule, such as a Syslog UDP listener, a Microsoft Graph API, a Twitter Stream Subscriber, Kafka Messaging, AWS SNS Messaging, McAfee DXL, Remote Log Tailer, etc. A custom trigger service 730 may connect to a port, such as port 514, which may be responsible for connecting with a SysLog Service 732, which is responsible for connecting to a playbook queue, such as queue 760. Thus, a custom trigger event of the custom trigger service 730 may be triggered based on listening externally for an event. Once the custom trigger service 730 detects a trigger event and is placed in queue 760, the triggering event executes the lifecycle of a Playbook, as discussed below. Additionally, the data of the trigger event may be provided to the Playbook. Further, a custom trigger event of the custom trigger service 730 may be triggered based on timer trigger that triggers a push type event after a predetermined time period.

Another example of a customized trigger event may be a custom WebHook service, such as WebHook service 740, which may receive a push type event that may include complex data that requires normalization or filtering, such as a Splunk CIM Trigger, Pager Duty Alert Trigger, Slack Event Trigger, ELK Alert Trigger, AMA Callback Trigger, etc. The data may be normalized, filtered, parsed, etc., and then WebHook service 740 may determine whether a Playbook should be triggered. For example, a custom WebHook service 740 may connect to a port, such as port 8443. The custom WebHook service 740 may include an app service that may be responsible for connecting with a PagerDuty Service 742, which is responsible for connecting to a playbook queue, such as queue 760. Once the custom WebHook service 740 detects a triggering event and is placed in queue 760, the triggering event executes the lifecycle of a Playbook, as discussed below. One use case for a WebHook service 740 may be for example a Microsoft graph notification service. The WebHook service 740 for the Microsoft graph notification service may be configured to monitor a mailbox for an email notification. If an email is received in the mailbox, then the WebHook service 740 may trigger a playbook associated with the configured Microsoft graph notification service. Another use case for a WebHook service 740 may include a Splunk CIM providing an alert to the WebHook service 740. WebHook service 740 may normalize, filter, and/or parse the alert, and determine whether a Playbook should be triggered based on the alert. If the WebHook service 740 determines that the Playbook should be triggered, then the normalized, filtered, and/or parsed data of the alert may be provided to the Playbook.

Yet another example of a customized trigger event may be a custom API service, such as API service 750, that may receive that may receive a pull type service where custom APIs may be built for third-party integrations, such as a CyberARK API, a Spaces API, a TAXII Server, CAL Services Wrapper, SQLite DataStore API, Redis DataStore API, MSSP-built Custom API, Custom API Extensions, etc. The custom API service 750 may be responsible for connecting with a CyberArk Service 752, which is responsible for connecting to a playbook queue, such as queue 760. Once the custom API service 750 detects a triggering event and is placed in queue 760, the triggering event executes the lifecycle of a Playbook, as discussed below.

Figure 8:
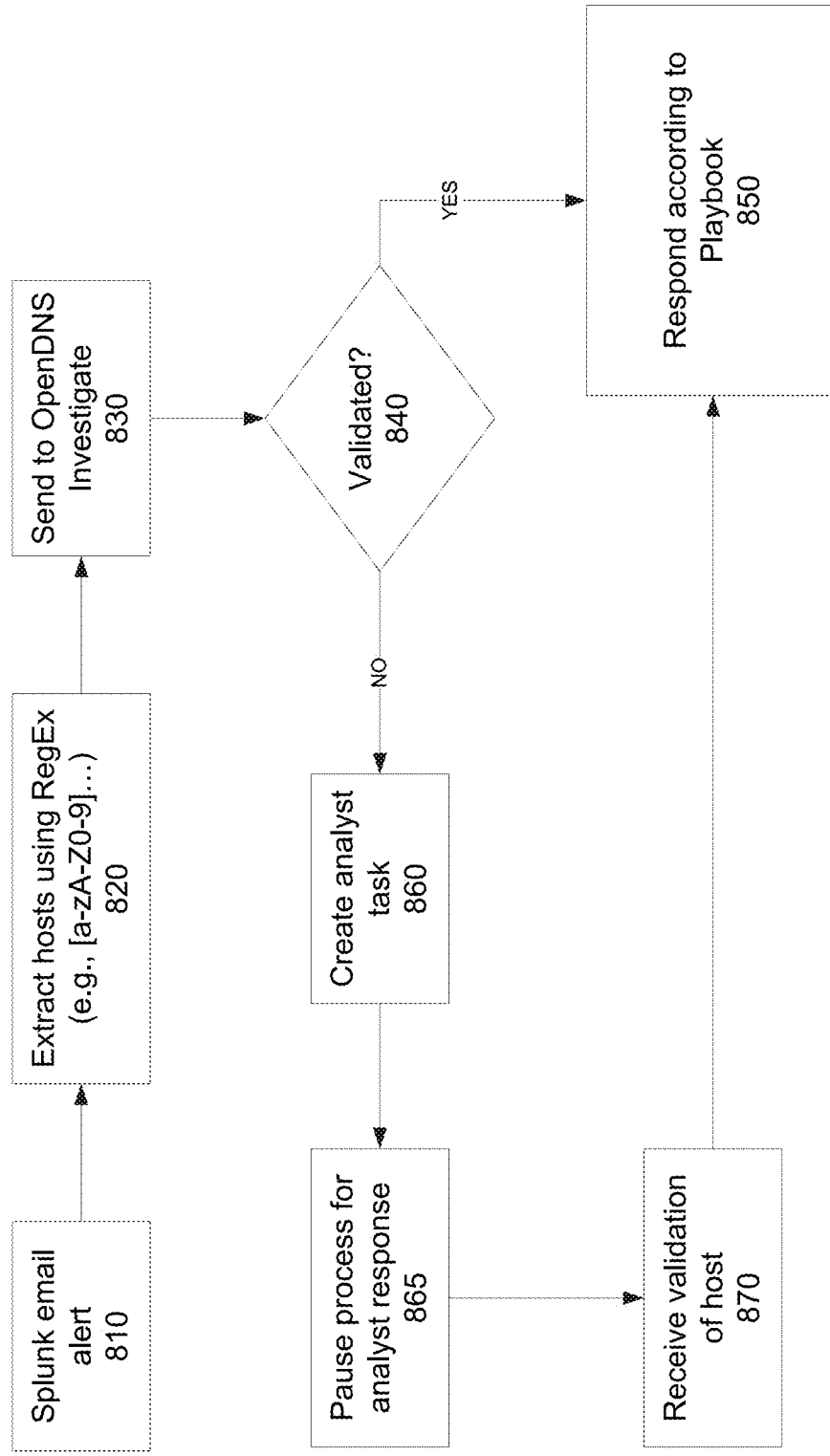
FIG. 8 illustrates an example of the orchestrated process according to a Playbook when the execution trigger is sending an email, according to embodiments disclosed herein.

FIG. 8 illustrates an example of the orchestrated process according to a Playbook when the execution trigger is sending an email, according to embodiments disclosed herein. In this example, Splunk 810 may be configured to send an alert of a new email to the SIEM, and the hosts embedded in the email can be extracted using a RegEx filter at 820. These hosts may be sent to a threat intelligence product at 830 (e.g., OpenDNS Investigate). If the threat intelligence product validates the host as malicious or otherwise a threat at 840, a security response may be automatically implemented at 850. If the threat intelligence product cannot validate the host at 840, an analyst task may be created at 860, and the orchestration process may be paused at 865 until an analyst can validate the threat. For example, once an analyst validates a threat at 870, the system receives an indication that the threat is validated, the orchestrated process may resume at 880 for an automated response according to the Playbook at 850. The orchestrated response, or Playbook, may be configurable via a user interface that is displayed to the user when the user is logged into the disclosed system. The user interface may permit dynamic configuration of the orchestrated process according to different trigger events and different criteria. The user interface, for example, may appear similar to the decision tree example illustrated in FIG. 8.

Figure 9:
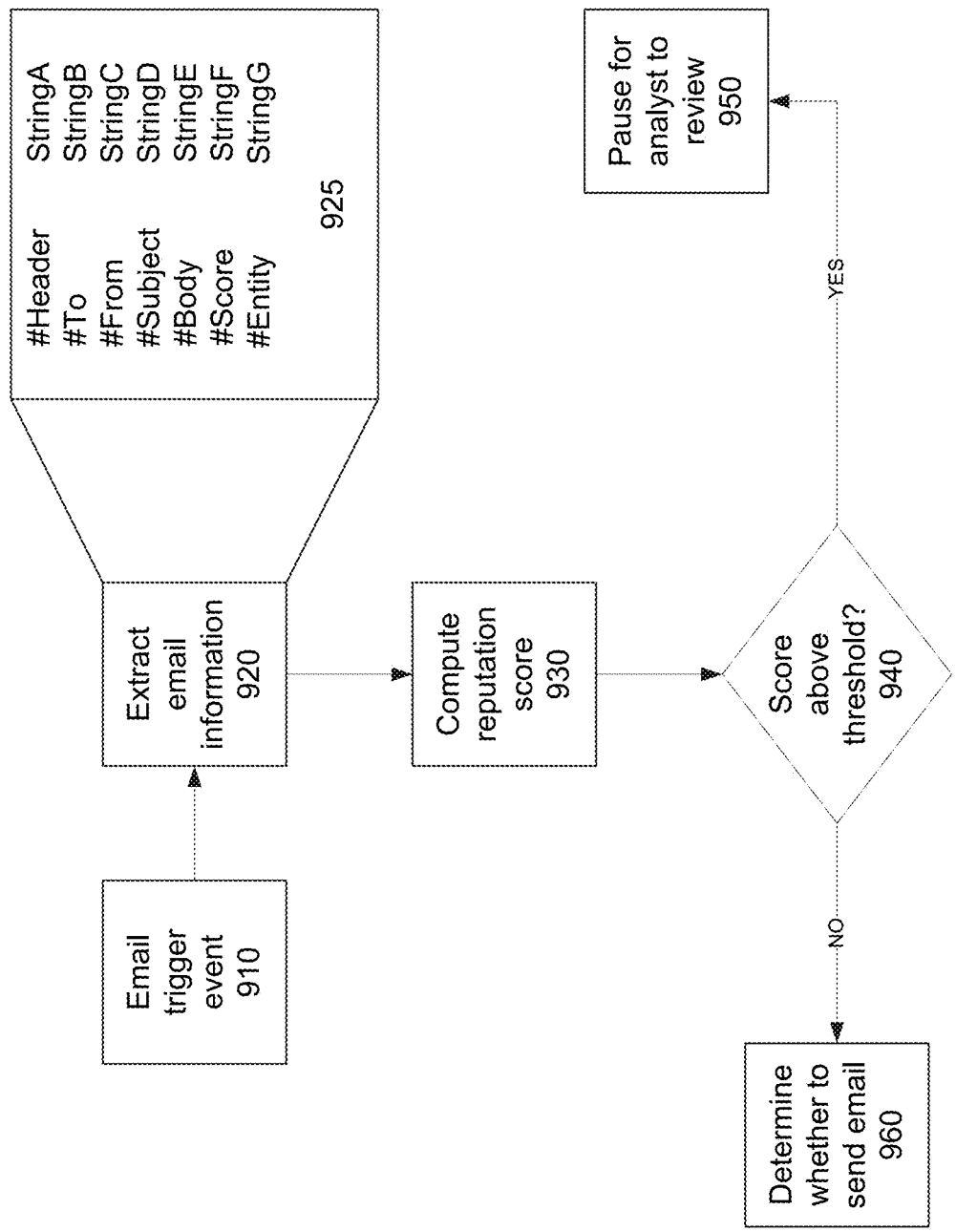
FIG. 9 is an example of different information types that can be extracted from email for determining how to respond via the orchestrated process.

FIG. 9 is an example of different information types that can be extracted from email for determining how to respond via the orchestrated process. An email may be received by the system, which may be identified as a part of the orchestrated response as a trigger event at 910. The system may be implemented on computer hardware such as the server architecture illustrated in FIG. 2. The email may be extracted for information at 920 by the system using, for example, Regex as a part of the orchestrated response. An example of the extracted information is provided in 925. A reputation score for the email may be determined according to the processes described earlier at 930. At 940, the system may determine whether the score exceeds a certain threshold. If the score exceeds a specified threshold at 950, the email may be classified as a high-risk threat, and the email can be sent to an analyst for further investigation such as the process disclosed in FIG. 8. If the score is below a certain threshold, the email can be processed as a low-risk threat according to an orchestrated threat model process, such as sending it to an enrichment source or OpenDNS Investigate at 960. For example, a part of the orchestrated response may include extracting information from the email for a filtering process that determines whether the email should be evaluated under a manual or orchestrated process, such as #to, #from, #subject, #body, among others. In some instances at 960, the orchestrated response may be to send the email to the end user (e.g., intended recipient thereof).

By automatic security responses and updates, the orchestrated process disclosed herein leverages existing threat intelligence integrated with security products, while at the same time preserving the limited resources of expert network security analysts. This combination improves the response time to growing cybersecurity threats with the same resources and collects and stores data as new threats are validated to further improve security processes. For example, if only one threat intelligence source has data on a particular malicious host, all other sources integrated with the orchestrated process could be updated with the new threat to improve the overall cybersecurity response.

Extensions for Connect to the Cloud-Based Enrichment and Analysis System

Network security analyst may have their own processes for doing research and analysis of cybersecurity threats. Network security analyst may leverage the multiple sources and the various methods for collecting and synthesizing intelligence. While a network security analyst is researching, the volume of information may be difficult to keep track of to determine whether an indicator is something known or new. When the network security analyst is connected to the cybersecurity threat intelligence system via a browser, such as a web browser, switching between tabs or windows of the browser and searching each indicator may be very time consuming, cumbersome, and inefficient. The network security analyst may need to stop current activity, log into multiple tools and platforms to find out whether the indicator is something known or new based related to any previous reporting, and ascertain if the indicator may be related to an active threat. Additionally, even if a network security analyst is using a threat intelligence platform, the network security analyst may not necessarily have a window into whether the network security larger industry is seeing a particular indicator or group. Further, if a network security analyst finds observables do pose a threat, the network security analyst may not be able to instantly run an automated action on those observables.

When the network security analyst is connected to the cybersecurity threat intelligence system, such as orchestrated STEM system 705, via the browser, the network security analyst may be able to check to see if an indicator, for example, an indicator found on a web page, may be something known or new. If the network security analyst finds the indictor, such as an IOC, is already saved in the cybersecurity threat intelligence system, the network security analyst may be able to add the new indicator to the data repository, along with any other information related to the new indicator to provide context for the new indicator.

In order to connected to the cybersecurity threat intelligence system via the browser, the network security analyst may install a browser extension in the browser of the network security analyst. After installing the browser extension, the network security analyst may configure the browser extension with one or more parameters.

Figure 10A:
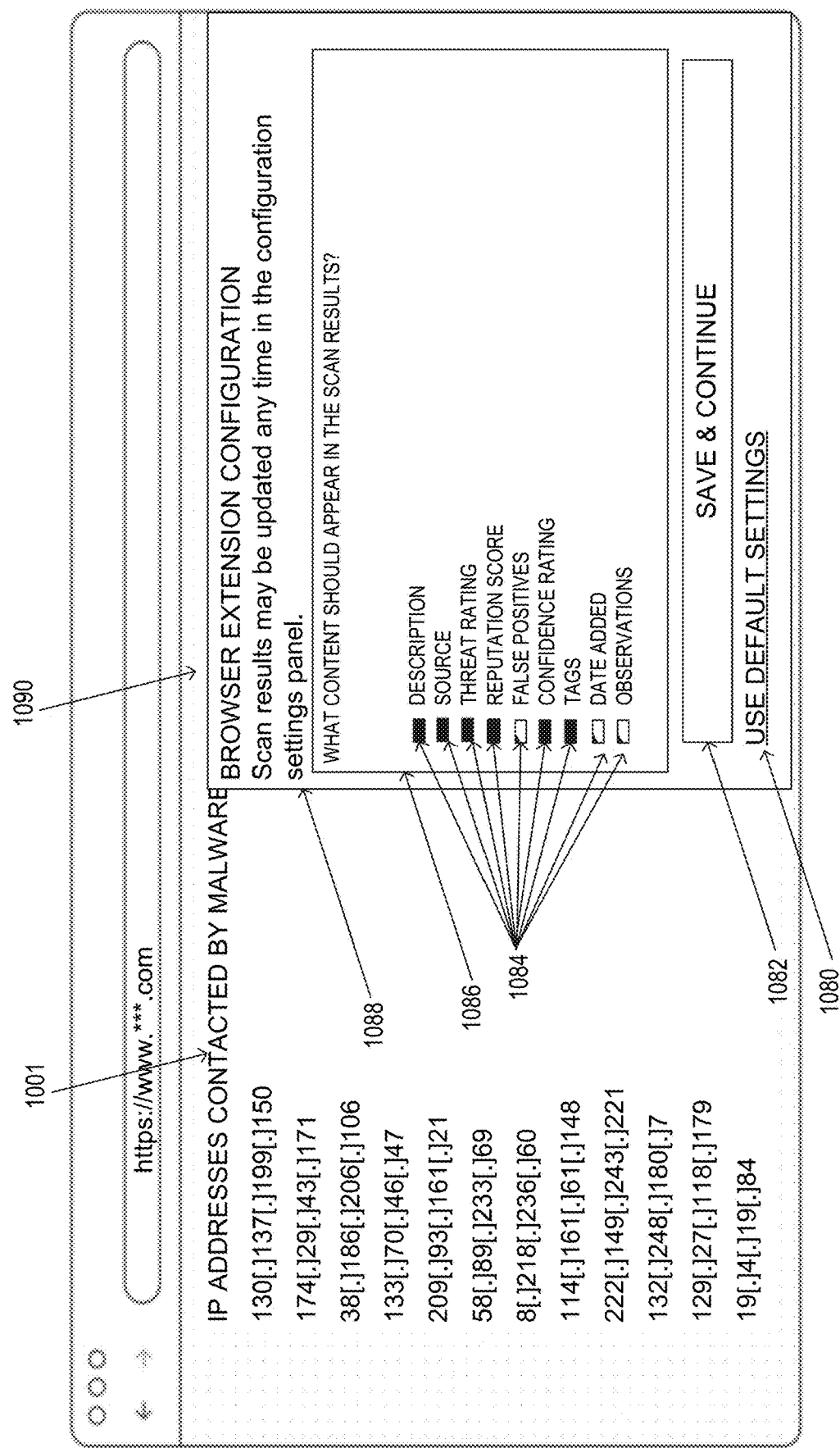
FIGS. 10A & 10B depict exemplary setting of the configurations of a browser extension, according to embodiments of the present disclosure.

For example, a particular network security analyst may configure her or his browser extension to query specific sources in the cybersecurity threat intelligence system import items into their cybersecurity threat intelligence system, and tell the browser extension what items should be returned. FIG. 10A depicts an exemplary setting of the configuration of the browser extension, according to embodiments of the present disclosure. As shown in FIG. 10A, a browser extension configuration box 1090 may be displayed as an overlay on browser 1001 and may include an explanation box 1088 that describes a current configuration setting, and a field box 1086 that includes a listing of the fields to be included in the scan results, each field having a check box 1084 that allows for selection of a field to be include in the scan results. One or more fields that may be included in the scan results include one or more of: Observations Last Observed, Observations (All Time), Observations within a predetermined time period (such as Previous 7 Days), False Positives (All Time), False within a predetermined time period (such as Previous 7 Days), Classifiers, Impressions (All Time), Impressions within a predetermined time period (such as Previous 7 Days), Feeds—Feeds Reporting this Indicator, Feeds—First Reported in a Feed, Feeds—Last Reported in a Feed, Feeds—Number of Feeds Reporting the Indicator, Indicator Status, Tags, Label, Description, Source Attribution, Reputation Score, Threat Rating, Confidence Rating, etc.

As shown in FIG. 10A, the fields of description, source, threat rating, reputation score, confidence rating, and tags are selected in the browser extension configuration box 1090 and will be included in scans results. Once a network security analyst has determined which fields are to be included in the scan results, the network security analyst may select an save/continue selector 1082 that allows for the settings to be save and the network security analyst may continue to configure the scan results to be returned from the cloud-based enrichment and analysis of cybersecurity threat intelligence system, such as orchestrated SIEM system 705. Additionally, the network security analyst may select the default link 1080 that causes a predetermined set of fields to be included in a default scan result returned from the cloud-based enrichment and analysis of cybersecurity threat intelligence system. Alternatively, browser extension configuration box 1090 may be displayed on a side of the browser 1001 or in a separate window.

Thus, a network security analyst may configure the browser extension to display a list of available fields that the cybersecurity threat intelligence system can return on indicators so that the network security analyst can set parameters for the browser extension on what information the network security analyst wants returned after scanning a static web page or a dynamic web page for observables in the browser. A network security analyst may select and/or deselect the fields returned when using the browser extension to scan a static web page or dynamic web page for observables in the browser.

Figure 10B:
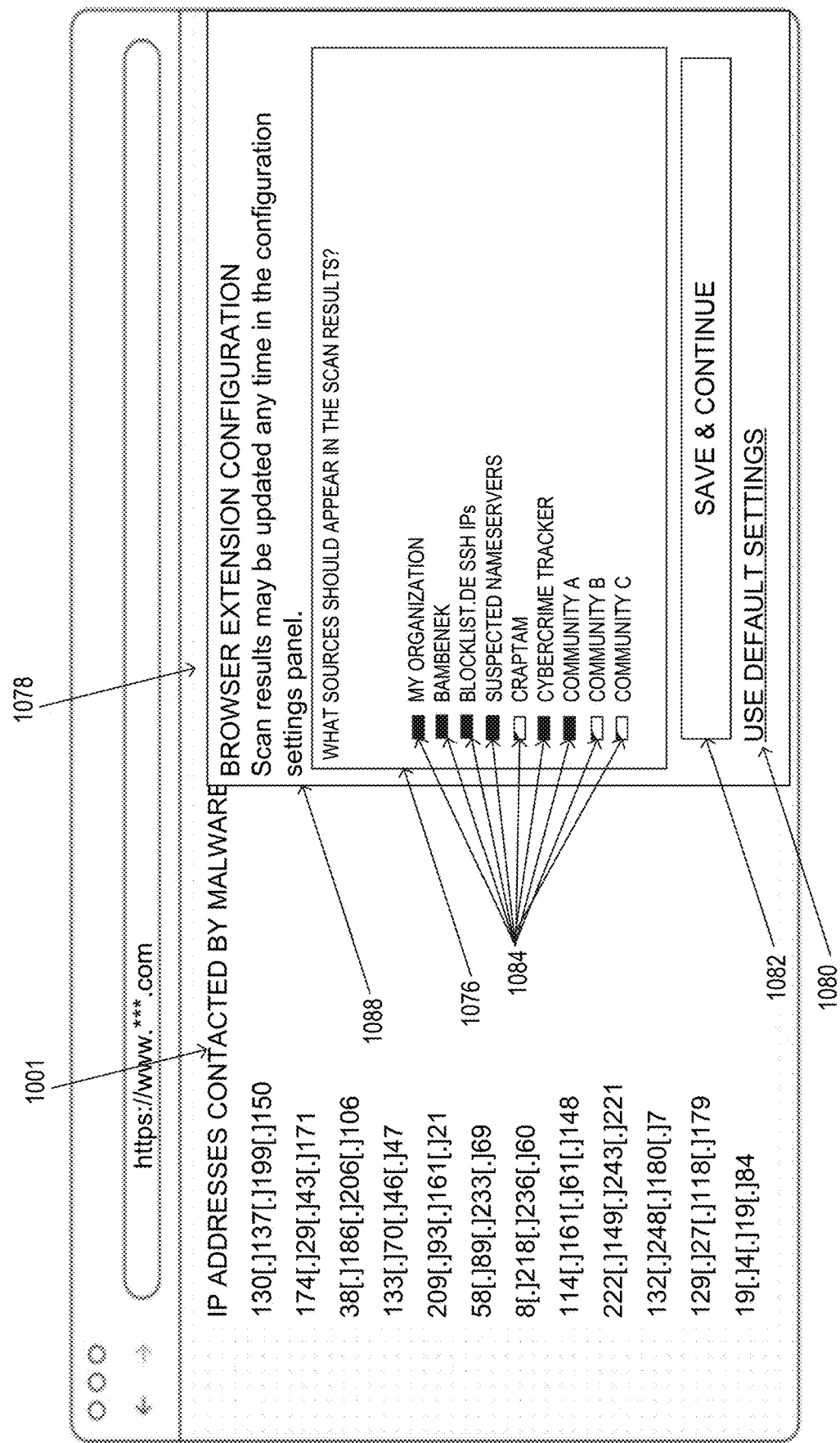

Further, a network security analyst may configure parameters of the browser extension to display a list of sources, organizations, and/or communities that the network security analyst has access to that can be queried when using the browser extension to scan a static web page or a dynamic web page for observables in the browser. As shown in FIG. 10B, a browser extension configuration box 1078 may be displayed as an overlay on browser 1001 and may include an explanation box 1088 that describes a current configuration setting, and a sources, organizations, and/or communities box 1076 that includes a listing of the sources, organizations, and/or communities to be used for the scan results, each of the sources, organizations, and/or communities having a check box 1084 that allows for selection of a sources, organizations, and/or communities to be include in the scan results. Once a network security analyst has determined which sources, organizations, and/or communities are to be used for the scan results, the network security analyst may select an save/continue selector 1082 that allows for the settings to be save and the network security analyst may continue to configure the scan results to be returned from the cloud-based enrichment and analysis of cybersecurity threat intelligence system. Additionally, the network security analyst may select the default link 1080 that causes a predetermined set of sources, organizations, and/or communities to be used for a default scan result returned from the cloud-based enrichment and analysis of cybersecurity threat intelligence system. Alternatively, browser extension configuration box 1078 may be displayed on a side of the browser 1001 or in a separate window.

In one example, all sources, organizations, and/or communities that the network security analyst has access may be selected by default. The network security analyst may select and deselect the sources, organizations, and/or communities to be queried prior to scanning a static web page or a dynamic web page in the browser, and return results on that set of observables in the browser. Moreover, the network security analyst may have the source, organizations, and/or community settings to carry over to future browser extension sessions so that the network security analyst is not required to reconfigure the browser extension every time it is used in the browser.

Figure 10C:
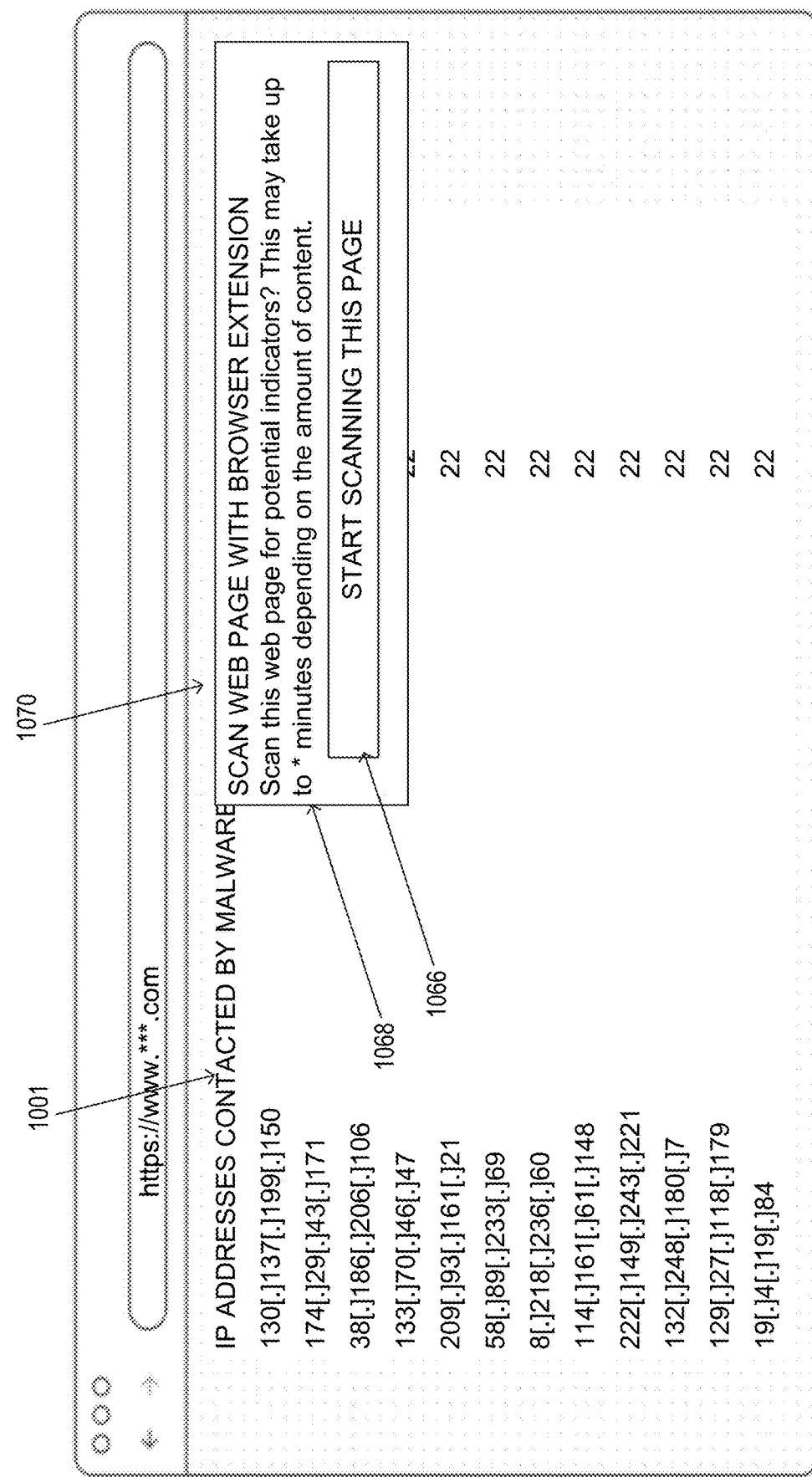
FIG. 10C depicts an exemplary selection of scanning an entire web page to be scanned by the browser extension, according to embodiments of the present disclosure.

After the network security analyst configures the browser extension, the network security analyst may select the content for cybersecurity threat assessment. The network security analyst may visit a web page with the browser having the browser extension installed and configured. For example, the network security may visit a dynamic web page, such as Twitter or Gmail, and have the browser extension scan the web page, account, or message. The network security analyst may identify what information they want to scan. For example, the network security analyze may identify whether the entire web page is to be scanned or a specific set of text and/or a part of the web page is to be scanned. FIG. 10C depicts an exemplary selection of scanning an entire web page to be scanned by the browser extension, according to embodiments of the present disclosure. As shown in FIG. 10C, a browser extension scan box 1070 may be displayed as an overlay on browser 1001 and may include an explanation box 1068 that describes the scanning process and may include an estimated amount of time the scanning may take. Once a network security analyst has scan the entire web page, the network security analyst may select a scan selector 1066 that allows for the scan to begin and for the scan to be sent to the cloud-based enrichment and analysis of cybersecurity threat intelligence system. Alternatively, browser extension scan box 1070 may be displayed on a side of the browser 1001 or in a separate window.

When a network security analyst identifies the entire web page is to be scanned, the network security analyst may activate the scan. For example, the network security analyst may click a button in the browser extension, such as an analyze button in the browser extension. Alternatively, the network security analyst may configure the browser extension to analyze any web page visited by the browser having the browser extension. After activating the scan, a query may launch. The browser extension may detect indicators on the web page, and then, the browser extension may query the cybersecurity threat intelligence system for those indicators. The cybersecurity threat intelligence system may return identified fields and show the network security analyst the available information in a list. For example, the list may be displayed on a right side of the browser. The list may include the fields selected by the network security analyst when configuring the browser extension.

Additionally, after a network security analyst has identified the specific set of text and/or the part of the web page that is to be scanned by, for example, highlighting content on the web page, the network security analyst may activate the scan, as explained above. The browser extension may then analyze one or both of web page source code (i.e., html) and/or may analyze the specific set of text.

When scanning the entire web page or the specific set of text and/or the part of the web page, the browser extension may analyze the web page/part of the web page to identify items of interest. As explained above, a RegEx filter, such as RegEx filter 720, may be applied to parse text and pull out identifying information from which a particular security threat may be assessed. Alternatively, a natural language process may be used to find adversarial tactics, techniques, and common knowledge techniques ("ATT&CK techniques"), threat actor groups, etc. Once the browser extension has the set of items and what the set of items are, such as, for example, host indicators, ATT&CK techniques, threat actor group, the browser extension may send those items to the cloud-based enrichment and analysis of cybersecurity threat intelligence system to request information on the set of items. When scanning the entire web page or the specific set of text and/or the part of the web page, the browser extension may use a sandbox of the browser. Alternatively, the browser may send the page to the cloud-based enrichment and analysis of cybersecurity threat intelligence system.

As explained above, the cloud-based enrichment and analysis of cybersecurity threat intelligence system may perform analysis on the set of items received from the browser extension, and send the analysis as a response back to the browser extension. After the browser extension receives the response from the cloud-based enrichment and analysis of cybersecurity threat intelligence system, the browser extension may display the results in the browser. For example, the browser extension may highlight and display the response to the network security analyst. Additionally and/or alternatively, the browser extension may display the response in a predetermined location in the browser, such as a side bar in the browser, and/or overlay the response information in the browser. In addition, the displaying of the response may be turned on and turned off by the browser extension.

Figure 11A:
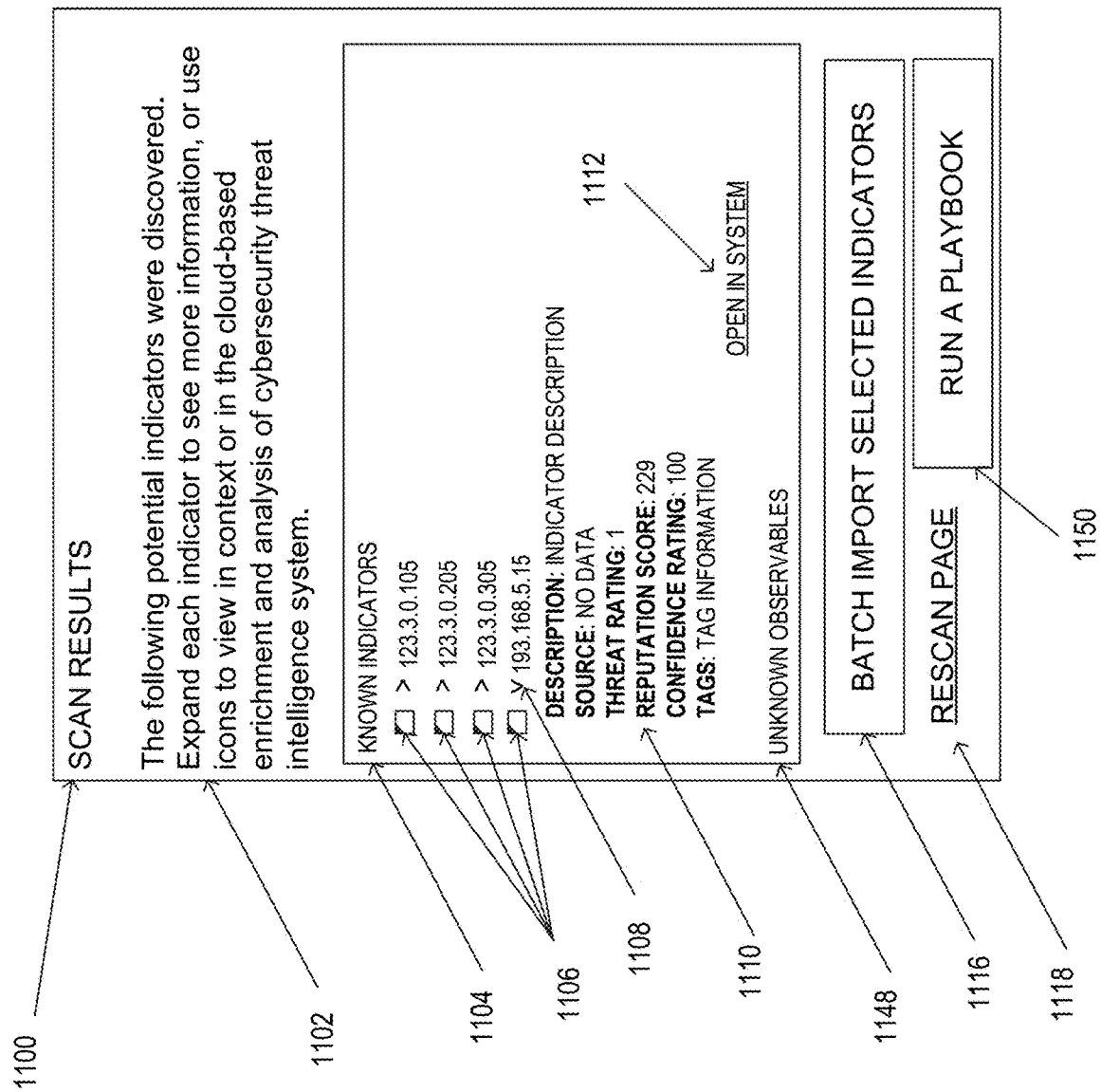
FIGS. 11A-11D depict exemplary scan results of the browser extension, according to embodiments of the present disclosure.

FIG. 11A depicts an exemplary scan result of the browser extension, according to embodiments of the present disclosure. As shown in FIG. 11A, a scan results box 1100 may include an explanation box 1102 that describes the results and actions that the network security analyst may select, a known indicator box 1104 that includes a listing of the indicators found, each indicator having a check box 1106 that allows for selection of an indicator to be imported into the browser extension and/or to have a playbook run for a selected indictor, and having an expansion selector 1108 that allows for the scan results for a particular indicator to be displayed. Additionally, each indicator, when the expansion selector 1108 is selected, includes one or more fields 1110 that display the particular scan results received from the cloud-based enrichment and analysis of cybersecurity threat intelligence system. For example, the fields included in the scan results may include one or more of: Observations Last Observed, Observations (All Time), Observations within a predetermined time period (such as Previous 7 Days), False Positives (All Time), False within a predetermined time period (such as Previous 7 Days), Classifiers, Impressions (All Time), Impressions within a predetermined time period (such as Previous 7 Days), Feeds—Feeds Reporting this Indicator, Feeds—First Reported in a Feed, Feeds—Last Reported in a Feed, Feeds—Number of Feeds Reporting the Indicator, Indicator Status, Tags, Label, Description, Source Attribution, Reputation Score, Threat Rating, Confidence Rating, etc.

As shown in FIG. 11A, the fields of description, source, threat rating, reputation score, confidence rating, and tags are displayed by the browser extension in the scans results box 1100. As described above, network security analyst may select and/or deselect the fields returned when configuring the browser extension. For each indicator, when the expansion selector 1108 is selected, the network security analyst may click link 1112 that allows for the scan results to be viewed in cloud-based enrichment and analysis of cybersecurity threat intelligence system.

The exemplary scan result of the browser extension, as shown in FIG. 11A, may also include an unknown observables box 1148 in the scan results box 1100, the unknown observables box may include a listing of the unknown observables found, each unknown observable may include a check box that allows for selection of an unknown observable to be imported into the browser extension and/or to have a playbook run for a selected unknown observable and an expansion selector that allows for the scan results for a particular unknown observable to be displayed. Additionally, each unknown observable, when the expansion selector is selected, includes one or more fields that display the particular scan results received from the cloud-based enrichment and analysis of cybersecurity threat intelligence system. The network security analyst may select an importation selector 1116 that allows for the scan results from the cloud-based enrichment and analysis of cybersecurity threat intelligence system to be imported into the computer system running the browser having the browser extension. Additionally, the network security analyst may select the rescan page link 1118 that causes a rescanning of the entire web page or the specific set of text and/or the part of the web page, the browser extension may analyze the web page/part of the web page to identify items of interest, and send those rescanned items to the cloud-based enrichment and analysis of cybersecurity threat intelligence system to request information on the set of items.

The scan results box 1100 may include or may not include a playbook selector 1150. When a network security analyst selects the playbook selector 1150, the network security analyst may request to have one or more orchestrated responses, such as a playbook, run by the cloud-based enrichment and analysis of cybersecurity threat intelligence system. For example, for each of the check boxes 1106 selected by the user, one or more orchestrated responses, such as a playbook, may be run for the indicators corresponding to the selected check boxes 1106.

As discussed above, the scan results box 1100 may allow a network security analyst to quickly view an indicator of compromise ("IOC") to learn more information about known indicators and/or unknown observables. The fields displayed with each IOC and/or unknown observable provide details and/or context received from the cloud-based enrichment and analysis of cybersecurity threat intelligence system.

Figure 11B:
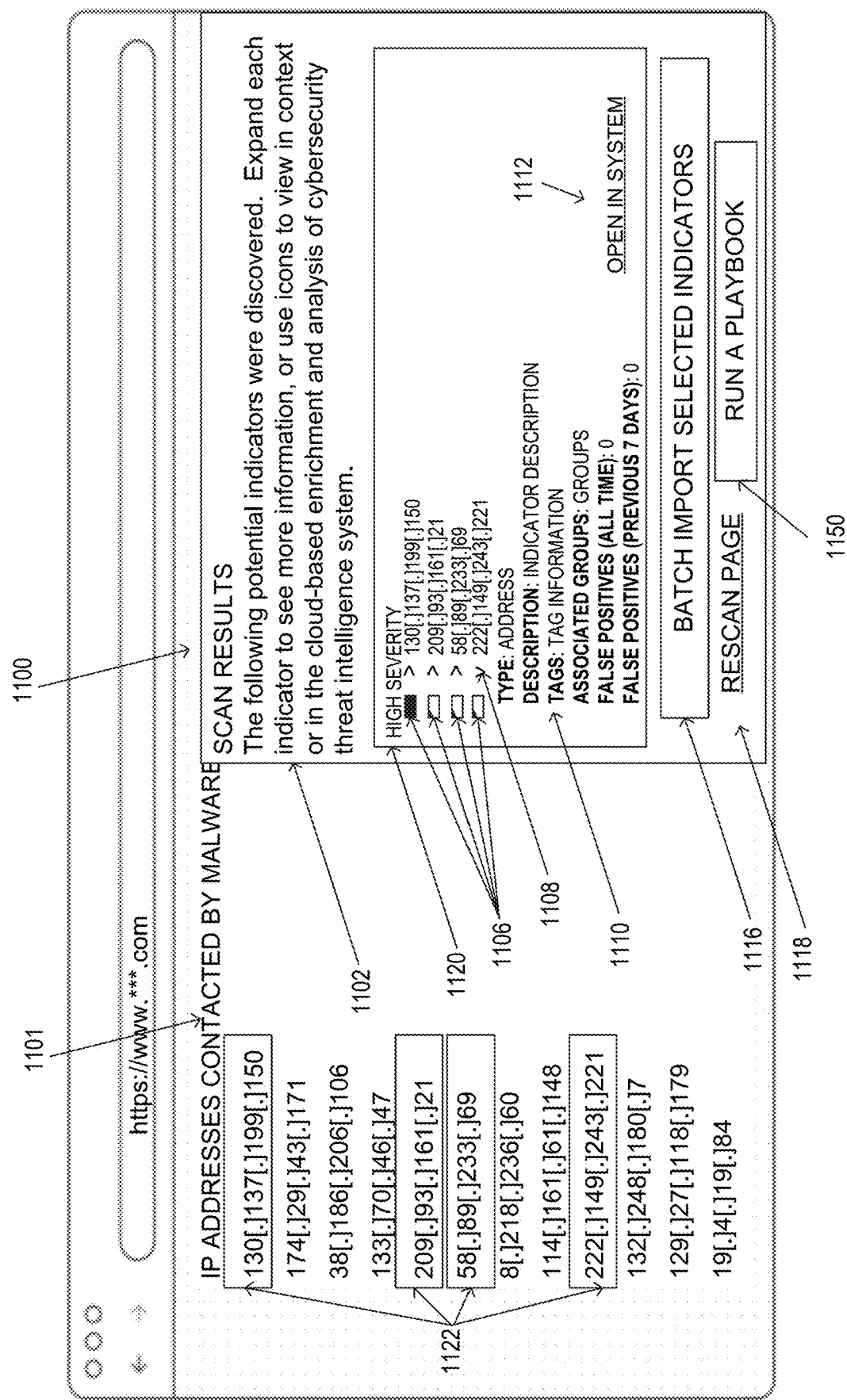

FIG. 11B depicts an exemplary scan result of the browser extension, according to embodiments of the present disclosure. As shown in FIG. 11B, a scan results box 1100 may overlay the web page 1101 and include an explanation box 1102 overlaying the web page 1101 that describes the results and actions that the network security analyst may select. High severity indicator box 1120 includes a listing of high severity indicators found, and the listing of the high severity indicators found have a corresponding high severity markup 1122, as shown in FIG. 11B. The high severity mark-up 1122 may be a box, highlight, color indication, text format, etc. that allows for the network security analyst to quickly identify the high severity indicator in the web page and corresponding high severity indicator in the scan results box 1100. Each high severity indicator may have a check box 1106 that allows for selection of an indicator to be imported into the browser extension and/or to have a playbook run for a selected high severity indictor, and may have an expansion selector 1108 that allows for the scan results for a particular high severity indicator to be displayed. Additionally, each high severity indicator, when the expansion selector 1108 is selected, includes one or more fields 1110 that display the particular scan results received from the cloud-based enrichment and analysis of cybersecurity threat intelligence system. As shown in FIG. 11B, the fields of type, description, tags, associated groups, false positives (all time), and false (previous 7 days) are displayed by the browser extension in the scans results box 1100. As described above, network security analyst may select and/or deselect the fields returned when configuring the browser extension. For each high severity indicator, when the expansion selector 1108 is selected, the network security analyst may click link 1112 that allows for the scan results to be viewed in cloud-based enrichment and analysis of cybersecurity threat intelligence system. The network security analyst may select an importation selector 1116 that allows for the scan results from the cloud-based enrichment and analysis of cybersecurity threat intelligence system to be imported into the computer system running the browser having the browser extension. Additionally, the network security analyst may select the rescan page link 1118 that causes a rescanning of the entire web page or the specific set of text and/or the part of the web page, the browser extension may analyze the web page/part of the web page to identify items of interest, and send those rescanned items to the cloud-based enrichment and analysis of cybersecurity threat intelligence system to request information on the set of items.

The scan results box 1100 may include or may not include a playbook selector 1150. When a network security analyst selects the playbook selector 1150, the network security analyst may request to have one or more orchestrated responses, such as a playbook, run by the cloud-based enrichment and analysis of cybersecurity threat intelligence system. For example, for each of the check boxes 1106 selected by the user, one or more orchestrated responses, such as a playbook, may be run for the indicators corresponding to the selected check boxes 1106.

Figure 11C:
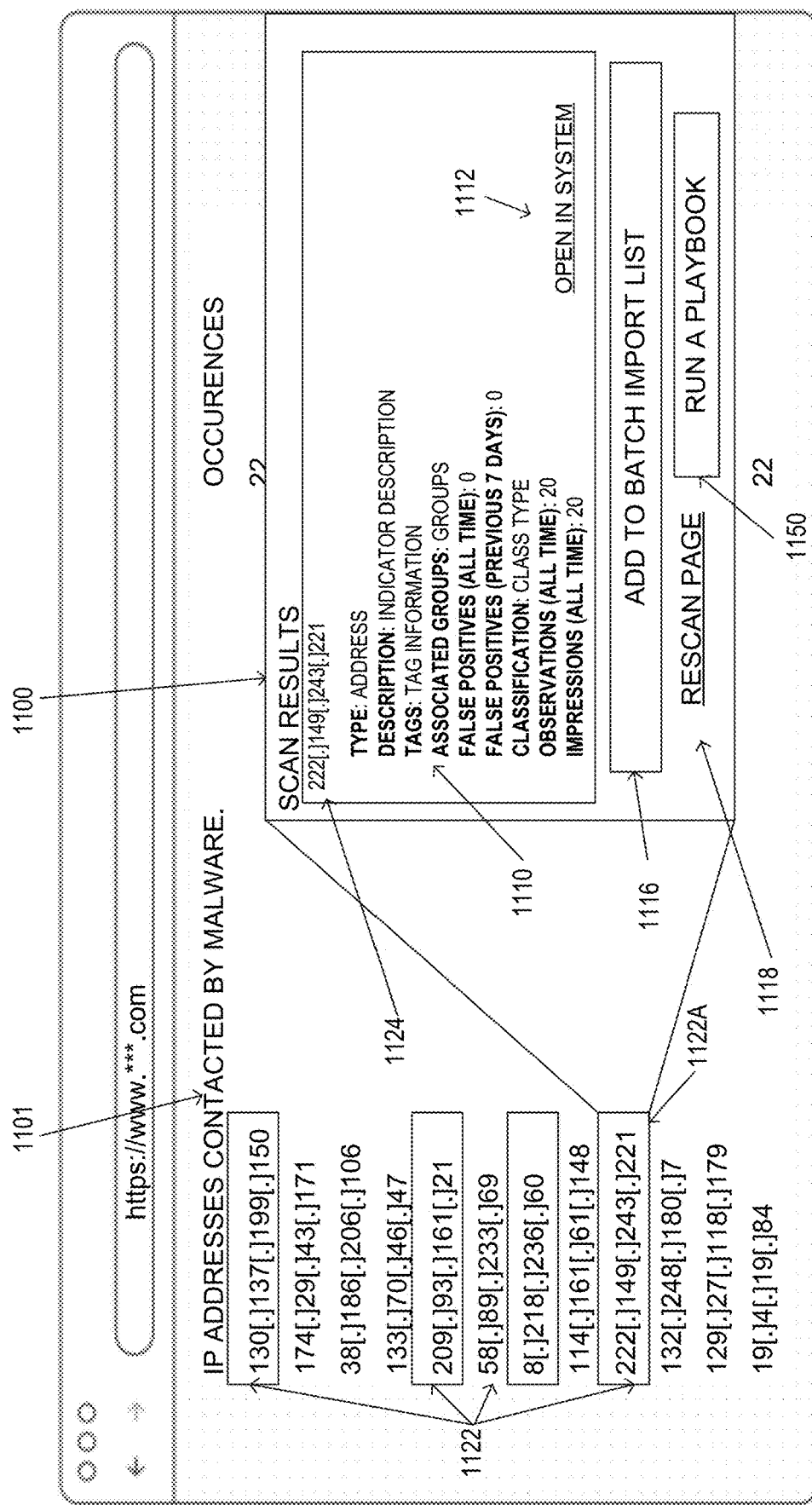

FIG. 11C depicts an exemplary scan result of the browser extension, according to embodiments of the present disclosure. As shown in FIG. 11C, a scan results box 1100 may overlay the web page 1101 and include a selected indicator box 1124 that corresponds to an indicator found and selected by the network security analyst. The selected indicator box 1124 corresponding to a mark-up 1122A, as shown in FIG. 11C. The mark-up 1122 may be a box, highlight, color indication, text format, etc. that allows for the network security analyst to quickly identify the selected indicator in the web page and corresponding indicator in the scan results box 1100. Additionally, the selected indicator box 1124, includes one or more fields 1110 that display the particular scan results received from the cloud-based enrichment and analysis of cybersecurity threat intelligence system. As shown in FIG. 11C, the fields of type, description, tags, associated groups, false positives (all time), false (previous 7 days), classification, observations (all time), and impressions (all time) are displayed by the browser extension in the scans results box 1100. As described above, network security analyst may select and/or deselect the fields returned when configuring the browser extension. The network security analyst may click link 1112 that allows for the scan results to be viewed in cloud-based enrichment and analysis of cybersecurity threat intelligence system. The network security analyst may select an importation selector 1116 that allows for the scan results from the cloud-based enrichment and analysis of cybersecurity threat intelligence system to be imported into the computer system running the browser having the browser extension.

The scan results box 1100 may include or may not include a playbook selector 1150. When a network security analyst selects the playbook selector 1150, the network security analyst may request to have one or more orchestrated responses, such as a playbook, run by the cloud-based enrichment and analysis of cybersecurity threat intelligence system. For example, for the selected indicator box 1124 that corresponds to the indicator selected by the user, one or more orchestrated responses, such as a playbook, may be run.

Figure 11D:
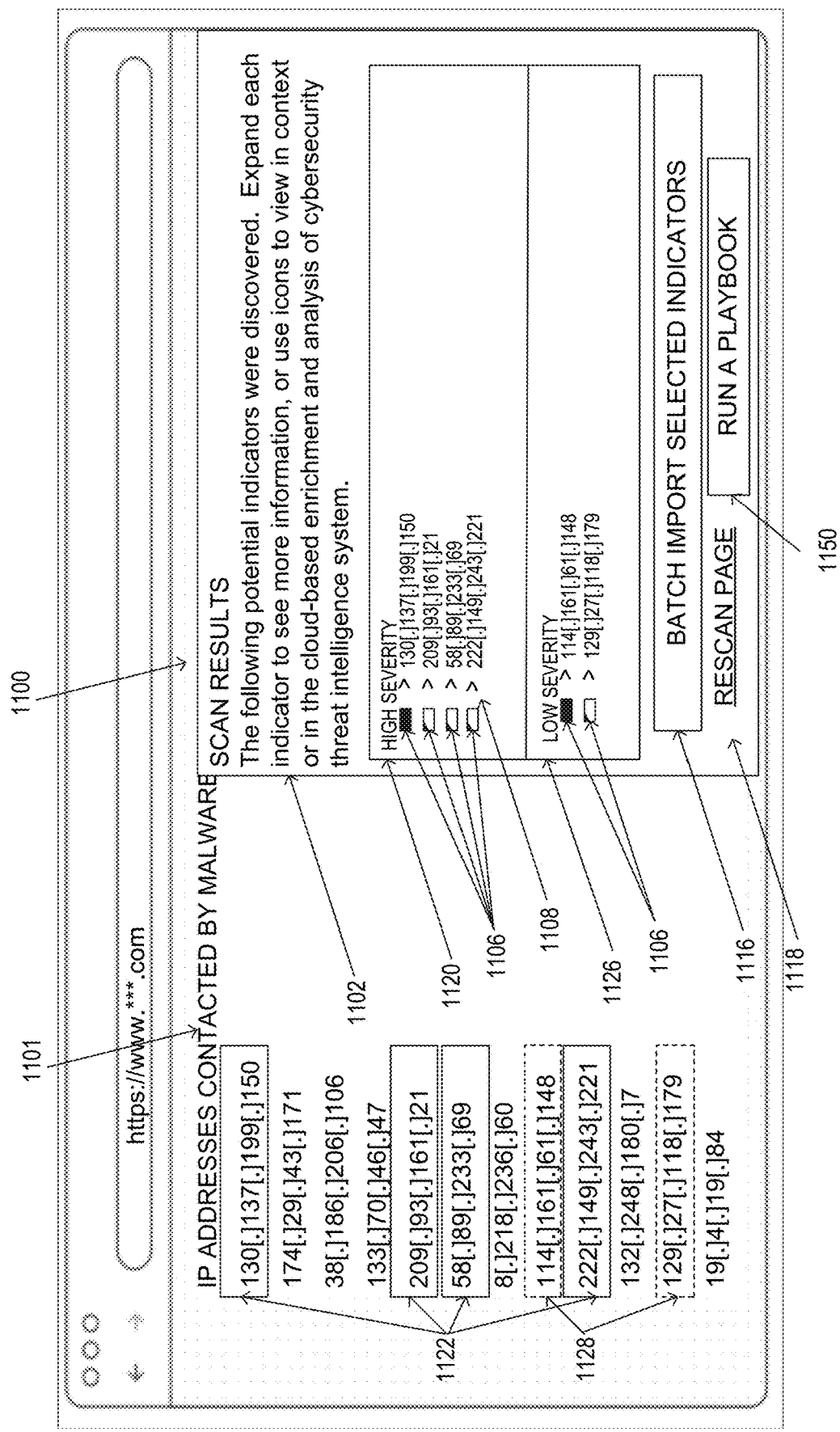

FIG. 11D depicts an exemplary scan result of the browser extension, according to embodiments of the present disclosure. As shown in FIG. 11D, a scan results box 1100 may overlay the web page 1101 and include an explanation box 1102 overlaying the web page 1101 that describes the results and actions that the network security analyst may select. High severity indicator box 1120 includes a listing of high severity indicators found, and the listing of the high severity indicators found have a corresponding high severity mark-up 1122, as shown in FIG. 11D. Low severity indicator box 1126 includes a listing of low severity indicators found, and the listing of the low severity indicators found have a corresponding low severity mark-up 1128, as shown in FIG. 11D.

The high severity mark-up 1122 may be a box, highlight, color indication, text format, etc. that allows for the network security analyst to quickly identify the high severity indicator in the web page and corresponding high severity indicator in the scan results box 1100. The low severity mark-up 1128 may be a box, highlight, color indication, text format, etc. that allows for the network security analyst to quickly identify the low severity indicator in the web page and corresponding high severity indicator in the scan results box 1100. The high severity mark-up 1122 and the low severity mark-up 1128 may be independently configured, and may be configured to be look the same or different. Moreover, each of the high severity indicators and each of the low severity indicators may be ordered based on a severity or unordered. Each high severity indicator and each low severity indicator may have a check box 1106 that allows for selection of an indicator to be imported into the browser extension and/or to have a playbook run for a selected high severity indictor, and may have an expansion selector 1108 that allows for the scan results for a particular high severity indicator or a particular low severity indicator to be displayed. Additionally, each high severity indicator or each low severity indicator, when the expansion selector 1108 is selected, includes one or more fields (not shown) that display the particular scan results received from the cloud-based enrichment and analysis of cybersecurity threat intelligence system. The network security analyst may select an importation selector 1116 that allows for the scan results from the cloud-based enrichment and analysis of cybersecurity threat intelligence system to be imported into the computer system running the browser having the browser extension. Additionally, the network security analyst may select the rescan page link 1118 that causes a rescanning of the entire web page or the specific set of text and/or the part of the web page, the browser extension may analyze the web page/part of the web page to identify items of interest, and send those rescanned items to the cloud-based enrichment and analysis of cybersecurity threat intelligence system to request information on the set of items.

The scan results box 1100 may include or may not include a playbook selector 1150. When a network security analyst selects the playbook selector 1150, the network security analyst may request to have one or more orchestrated responses, such as a playbook, run by the cloud-based enrichment and analysis of cybersecurity threat intelligence system. For example, for each of the check boxes 1106 selected by the user, one or more orchestrated responses, such as a playbook, may be run for the indicators corresponding to the selected check boxes 1106. From the scan results box 1100, the network security analyst may be able to add, update, or create new data or append existing data for the indicators and observables and may share the new data or appended data with the cloud-based enrichment and analysis of cybersecurity threat intelligence system. For example, the network security analyst may import IOCs, group IOCs, add IOCs to an existing group, save data from page information, such as a screenshot of the web page as a group or artifact, add additional details to imported data, such as add tags to imported data, and add attributes to imported data.

In one embodiment of the present disclosure, the cloud-based enrichment and analysis of cybersecurity threat intelligence system may add an impression in a database, which allows the system to learn that a network security analyst queried a particular indicator or observable. The cloud-based enrichment and analysis of cybersecurity threat intelligence system may learn analytics, via, for example, machine learning engine 360, based on the aggregate, time-based patterns of queries, which may be able to identify areas of interest across various networks. If there is a sudden spike in interest on a piece of intelligence, that may be a useful insight for both subsequent analytics or as a raw insight for the network security analyst.

Figure 12A:
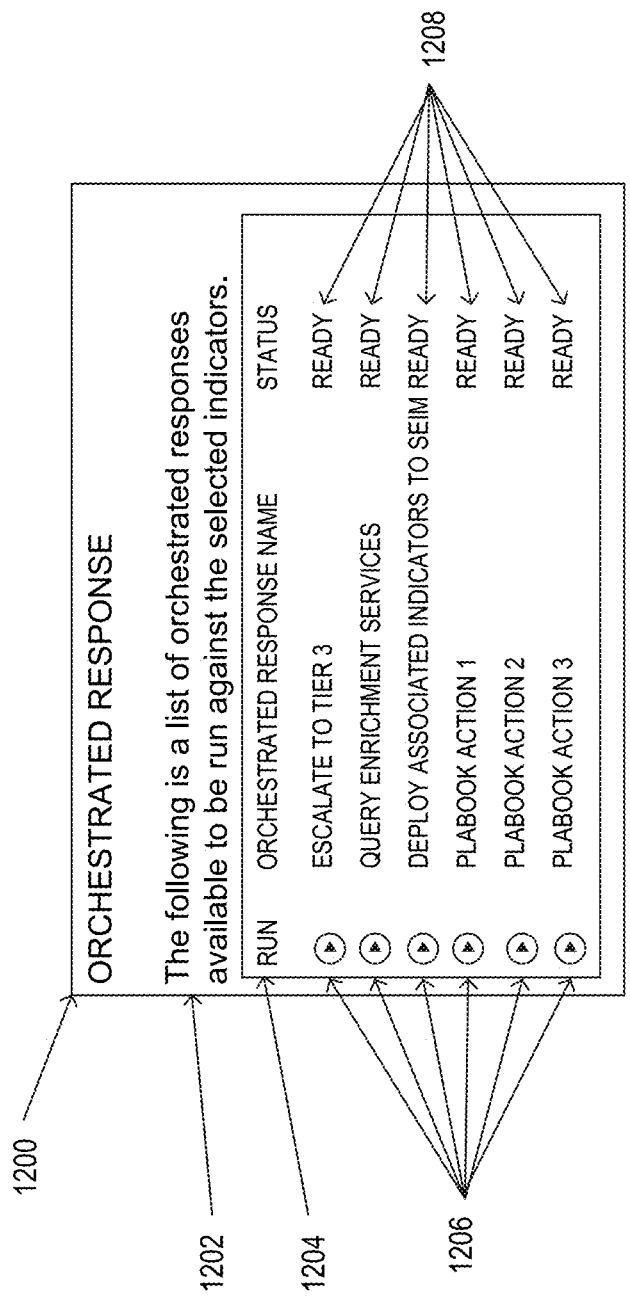
FIG. 12A depicts exemplary orchestrated responses that may be deployed by the browser extension, according to embodiments of the present disclosure.

FIG. 12A depicts exemplary orchestrated responses that may be deployed by the browser extension, according to embodiments of the present disclosure. When a network security analyst selects to deploy an orchestrated response, such as by selecting the playbook selector 1150 for one or more selected indicators, an orchestrated response box 1200 may be displayed. The orchestrated response box 1200 may include an explanation box 1202 that describes the orchestrated responses that the network security analyst may select to run in the browser, and a list of orchestrated responses 1204 available to be selected by the network security analyst. Each of the available orchestrated responses in the list of orchestrated responses 1204 may include an action selector 1206 that allows a network security analyst to deploy a particular orchestrated response, a name of the orchestrated response, and a status 1208 of the orchestrated response. The network security analyst may select one or more action selectors 1206, which runs the corresponding orchestrated response in the browser, such as in a sandbox of the browser, and/or on the cloud-based enrichment and analysis of cybersecurity threat intelligence system. Alternatively, browser extension scan box 1200 may be displayed on a side of the browser or be an overlay on the web page of the browser.

Figure 12B:
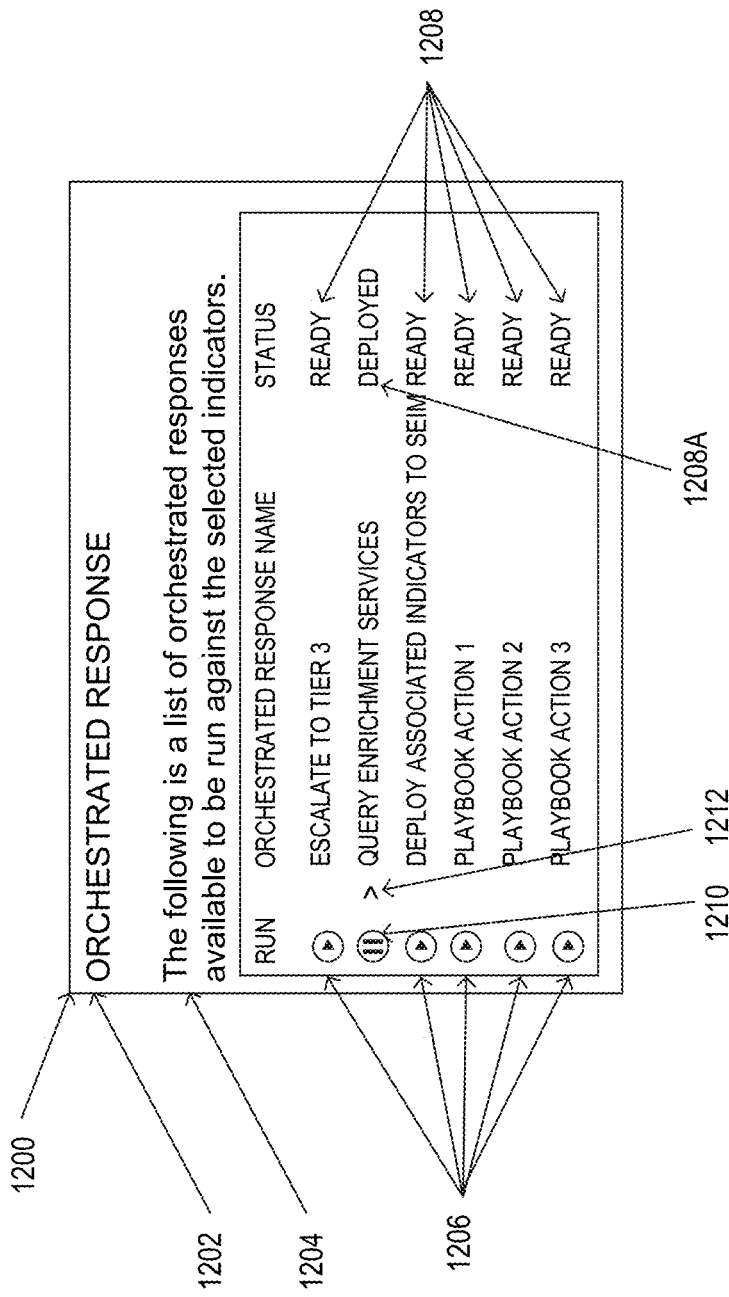
FIG. 12B depicts an exemplary orchestrated response deployed by the browser extension, according to embodiments of the present disclosure.

FIG. 12B depicts an exemplary orchestrated response deployed by the browser extension, according to embodiments of the present disclosure. When a network security analyst selects the action selector 1206 to deploy a particular orchestrated response, an updated action selector 1210 may be displayed, the updated action selector 1210 may allow the network security analyst to pause the deployment of the selected particular orchestrated response. Additionally, when the network security analyst selects the action selector 1206 to deploy the particular orchestrated response, the status 1208 of the particular orchestrated response may be updated to a deployed status 1208A. Further, when the network security analyst selects the action selector 1206 to deploy the particular orchestrated response, an expansion selector 1212 that allows for results of the particular orchestrated response to be displayed. While the embodiments show one orchestrated response being deployed, a plurality of orchestrated responses may be deployed simultaneous and/or sequentially by the network security analyst. For example, the network security analyst may select a plurality of action selectors 1206, which runs the corresponding orchestrated response in the browser, such as in a sandbox of the browser, and/or on the cloud-based enrichment and analysis of cybersecurity threat intelligence system.

Figure 12C:
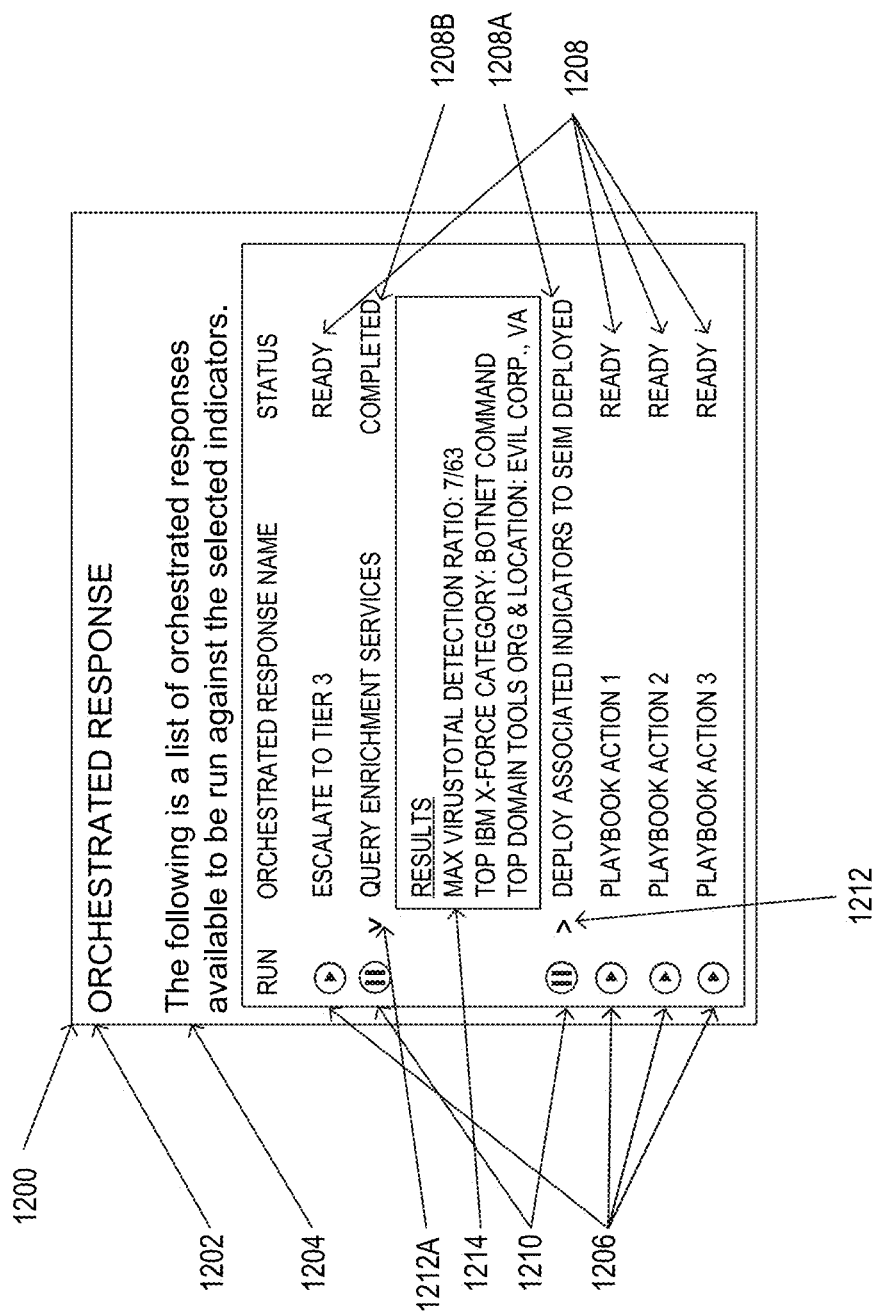
FIG. 12C depicts exemplary orchestrated responses deployed by the browser extension, according to embodiments of the present disclosure.

FIG. 12C depicts exemplary orchestrated responses deployed by the browser extension, according to embodiments of the present disclosure. When a network security analyst selects another action selector 1206 to deploy a particular orchestrated response, updated action selectors 1210 may be displayed, the updated action selectors 1210 may allow the network security analyst to pause the deployment of the selected particular orchestrated responses. Additionally, when the network security analyst selects the action selector 1206 to deploy the particular orchestrated response, the status 1208 of the particular orchestrated response of the another action selector 1206 may be updated to an updated status 1208A. Further, when the particular orchestrated response deployed has completed, the deployed status 1208A of the particular orchestrated response may be updated to a completed status 1208B. Moreover, when the expansion selector 1212 that allows for results of the particular orchestrated response to be displayed, the expansion selector may be updated to an expanded selector 1212A, and the completed orchestrated response results 1214 of the particular orchestrated response may be displayed.

Figure 12D:
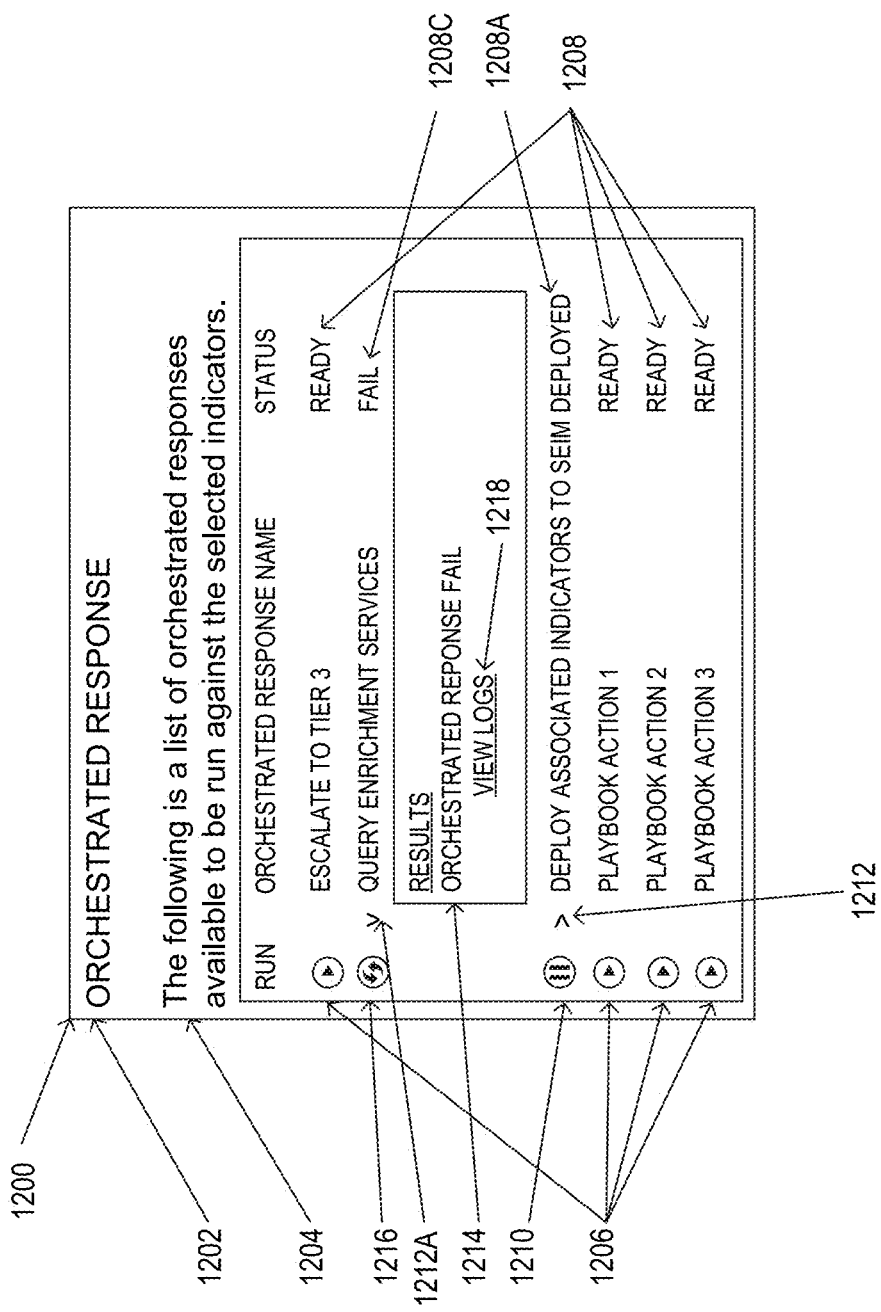
FIG. 12D depicts exemplary orchestrated responses deployed by the browser extension, according to embodiments of the present disclosure.

FIG. 12D depicts exemplary orchestrated responses deployed by the browser extension, according to embodiments of the present disclosure. When a network security analyst selects another action selector 1206 to deploy a particular orchestrated response, updated action selectors 1210 may be displayed, the updated action selectors 1210 may allow the network security analyst to pause the deployment of the selected particular orchestrated responses. When an orchestrated response fails the retry action selector 1216 may be displayed, the retry action selector 1216 may allow the network security analyst to redeploy the selected particular orchestrated responses. Additionally, when the network security analyst selects the action selector 1206 to deploy the particular orchestrated response, the status 1208 of the particular orchestrated response of the another action selector 1206 may be updated to an updated status 1208A. Further, when the particular orchestrated response deployed has failed to complete, the deployed status 1208A of the particular orchestrated response may be updated to a fail status 1208C. Moreover, when the expansion selector 1212 that allows for results of the particular orchestrated response to be displayed, the expansion selector may be updated to an expanded selector 1212A, and the failed orchestrated response results 1214 of the particular orchestrated response may be displayed, and the failed results 1214 may include a link 1218 to view a log associated with the failed orchestrated response results, which may allow the network security analyst quickly determine a reason for the failure.

As discussed above, the orchestrated response box 1200 may allow a network security analyst to quickly deploy one or more orchestrated responses in response to one or more selected indicators and/or unknown observables and to learn more information about selected indicators and/or unknown observables. The results of the one or more orchestrated responses displayed may provide details and/or context received from the cloud-based enrichment and analysis of cybersecurity threat intelligence system one or more selected indicators and/or unknown observables. Further, the network security analyst may share the results of the orchestrated responses with third parties, such as for example, sending set of IOCs to VirusTotal or DomainTools for further enrichment.

Figure 13:
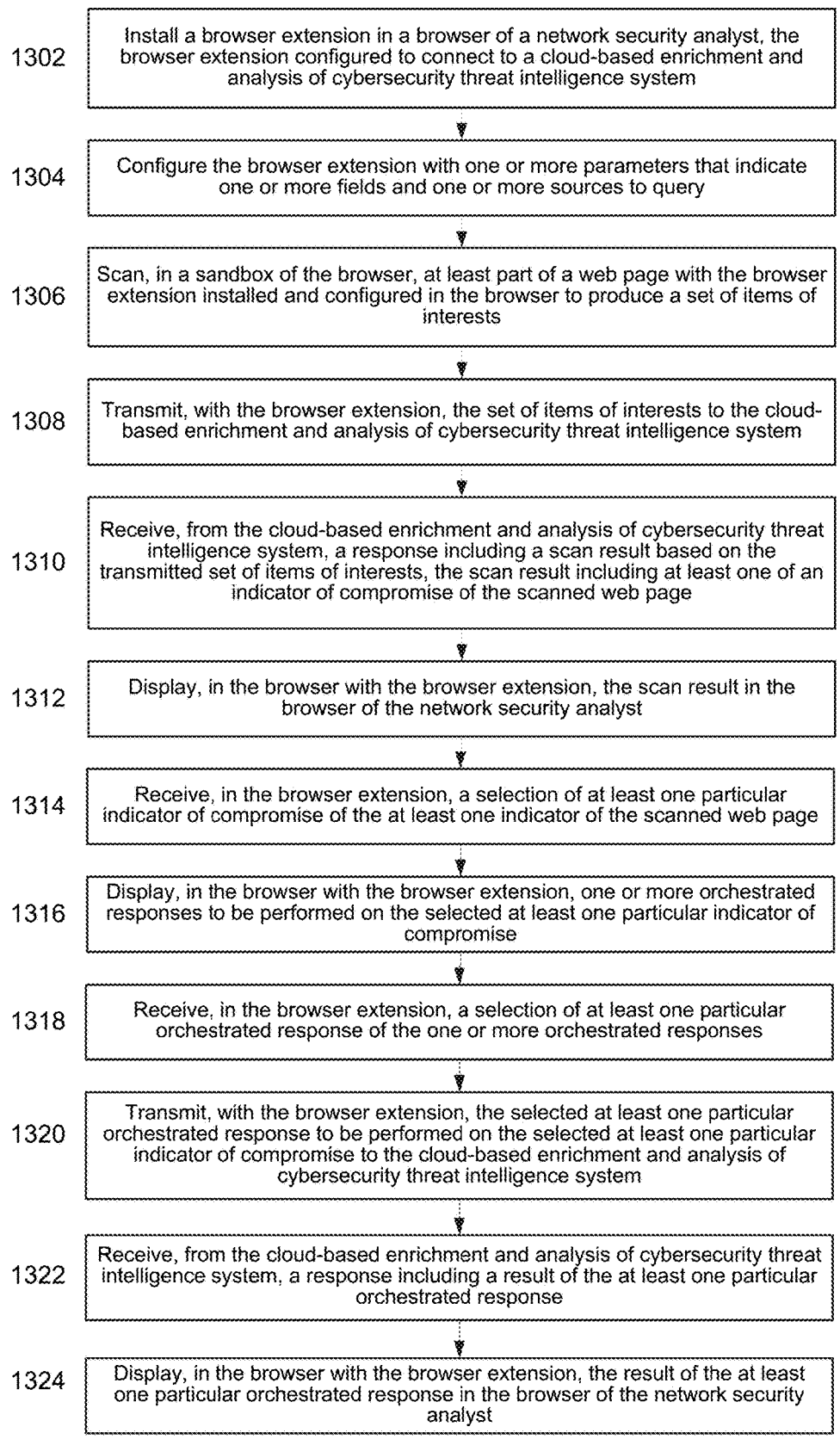
FIG. 13 is an example of the processes performed to configure, scan web pages, and deploy orchestrated responses by the browser extension, according to embodiments of the present disclosure.

FIG. 13 is an example of the processes performed to configure, scan web pages, and deploy orchestrated responses by the browser extension, according to embodiments of the present disclosure. At 1302, a network security analyst may install a browser extension in a browser, the browser extension configured to connect to a cloud-based enrichment and analysis of cybersecurity threat intelligence system. In particular, the browser extension enables the network security analyst to scan web pages for indicators of compromise and observables and deploy orchestrated responses on the indicators of compromise and observables. At 1304, the network security analyst may configure the browser extension with one or more parameters that indicate one or more fields and one or more sources to be queried by the cloud-based enrichment and analysis of cybersecurity threat intelligence system. For example, the one or more fields that may be included in scan results may include one or more of Observations Last Observed, Observations (All Time), Observations within a predetermined time period (such as Previous 7 Days), False Positives (All Time), False within a predetermined time period (such as Previous 7 Days), Classifiers, Impressions (All Time), Impressions within a predetermined time period (such as Previous 7 Days), Feeds—Feeds Reporting this Indicator, Feeds—First Reported in a Feed, Feeds—Last Reported in a Feed, Feeds—Number of Feeds Reporting the Indicator, Indicator Status, Tags, Label, Description, Source Attribution, Reputation Score, Threat Rating, Confidence Rating, etc. The one or more sources may be sources, organizations, and/or communities to which the network security analyst has access. In one embodiment, the network security analyst may select default fields that include a plurality of predetermined fields and default sources that include a plurality of predetermined sources to be included in the scan results.

At 1306, the network security analyst may scan, in a sandbox of the browser, at least part of a web page with the browser extension installed and configured in the browser to produce a set of items of interests. The browser extension may be used to analyze the web page/part of the web page to identify items of interest. As explained above, RegEx filter 720 may be applied to parse text and pull out identifying information from which a particular security threat may be assessed. Alternatively, a natural language process may be used to find ATT&CK techniques, threat actor groups, etc. Once the browser extension has the set of items and what the set of items are, such as, for example, host indicators, ATT&CK techniques, threat actor group, the browser extension at 1308 may transmit, with the browser extension, the set of items of interests to the cloud-based enrichment and analysis of cybersecurity threat intelligence system to request information on the set of items. When scanning the entire web page or the specific set of text and/or the part of the web page, the browser extension may use a sandbox of the browser. Alternatively, the browser may send the page to the cloud-based enrichment and analysis of cybersecurity threat intelligence system. The cloud-based enrichment and analysis of cybersecurity threat intelligence system may perform analysis on the set of items received from the browser extension, and transmit the analysis as a response including scan results back to the browser extension.

At 1310, the browser extension may receive a response from the cloud-based enrichment and analysis of cybersecurity threat intelligence system, the response including a scan result based on the transmitted set of items of interests, and the scan result including at least one of an indicator of compromise of the scanned web page. At 1312, after the browser extension receives the response from the cloud-based enrichment and analysis of cybersecurity threat intelligence system, the browser extension may display the results in the browser. For example, the browser extension may highlight and display the response to the network security analyst. Additionally and/or alternatively, the browser extension may display the response in a predetermined location in the browser, such as a side bar in the browser, and/or overlay the response information in the browser. In addition, the displaying of the response may be turned on and turned off by browser extension.

For example a scan results box may include an explanation box that describes the results and actions that the network security analyst may select, a known indictor box that includes a listing of the indicators found, each indicator having a check box that allows for selection of an indicator to be imported into the browser extension and/or to have a playbook run for a selected indictor, and having an expansion selector that allows for the scan results for a particular indicator to be displayed. For each indicator, when the expansion selector is selected, the network security analyst may click link that allows the scan results to be opened and viewed in the cloud-based enrichment and analysis of cybersecurity threat intelligence system. Additionally, the network security analyst may select the rescan page link that causes a rescanning of the entire web page or the specific set of text and/or the part of the web page, the browser extension may analyze the web page/part of the web page to identify items of interest, and transmit those rescanned items to the cloud-based enrichment and analysis of cybersecurity threat intelligence system to request information on the set of items. The scan results box may also include a playbook selector for requesting to have one or more orchestrated responses, such as a playbook, run by the cloud-based enrichment and analysis of cybersecurity threat intelligence system.

At 1314, a selection by the network security analyst of at least one particular indicator of compromise of the scanned web page may be received in the browser extension. When the at least one particular indicator of compromise of the scanned web is selected, the network security analyst may click a link that allows the scan results to be opened and viewed in the cloud-based enrichment and analysis of cybersecurity threat intelligence system. Additionally, the network security analyst may select the rescan page link that causes a rescanning of the entire web page or the specific set of text and/or the part of the web page, the browser extension may analyze the web page/part of the web page to identify items of interest, and transmit those rescanned items to the cloud-based enrichment and analysis of cybersecurity threat intelligence system to request information on the set of items. At 1316, one or more orchestrated responses to be performed on the selected at least one particular indicator of compromise may be displayed. At 1318, a selection by the network security analyst of at least one particular orchestrated response of the one or more orchestrated responses may be received in the browser extension. When the network security analyst selects to deploy one or more orchestrated responses for the at least one particular indicator of compromise of the scanned web page, an orchestrated response box may be displayed. The orchestrated response box may include an explanation box that describes the orchestrated responses that the network security analyst may select to run in the browser, as well as a list of orchestrated responses available to be selected by the network security analyst. Each of the available orchestrated responses in the list of orchestrated responses may include an action selector that allows the network security analyst to deploy at least one particular orchestrated response, a name of the at least one orchestrated response, and a status of the at least one orchestrated response. The network security analyst may select one or more action selectors, which runs the corresponding orchestrated response in the browser, such as in a sandbox of the browser, and/or on the cloud-based enrichment and analysis of cybersecurity threat intelligence system. While the embodiments show one orchestrated response being deployed, a plurality of orchestrated responses may be deployed simultaneous and/or sequentially by the network security analyst.

At 1320, the selected at least one particular orchestrated response to be performed on the selected at least one particular indicator of compromise to the cloud-based enrichment and analysis of cybersecurity threat intelligence system may be transmitted with the browser extension. When a network security analyst selects the action selector to deploy a particular orchestrated response, an updated action selector may be displayed, the updated action selector may allow the network security analyst to pause the deployment of the selected particular orchestrated response. Additionally, when the network security analyst selects the action selector to deploy the particular orchestrated response, the status of the particular orchestrated response may be updated to a deployed status. Further, when the network security analyst selects the action selector to deploy the particular orchestrated response, an expansion selector that allows for results of the particular orchestrated response to be displayed. The cloud-based enrichment and analysis of cybersecurity threat intelligence system may perform the at least one particular orchestrated response, and transmit a response including a results back to the browser extension. At 1322 the browser extension may receive, from the cloud-based enrichment and analysis of cybersecurity threat intelligence system, a response including a result of the at least one particular orchestrated response. The result may also include a status of the deployment of at least one particular orchestrated response, the ability to pause deployment of at least one particular orchestrated response, the ability to redeploy the at least one particular orchestrated response. Then, at 1324, the result of the at least one particular orchestrated response in the browser of the network security analyst may be displayed in the browser with the browser extension.

Figure 14:
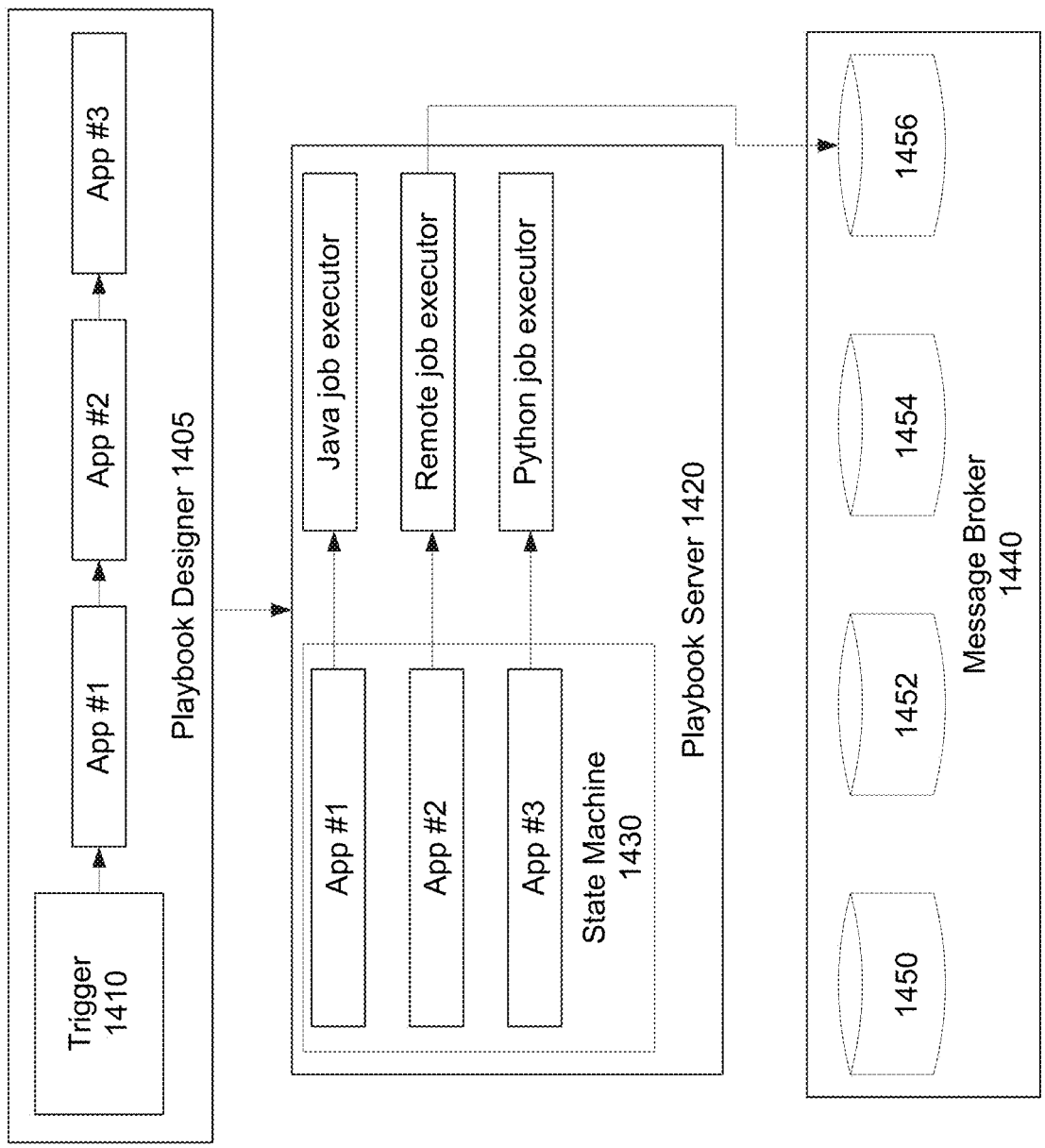
FIG. 14 is an example overview of the server architecture upon which the system may be implemented.

FIG. 14 is an example overview of the server architecture upon which the system may be implemented. A Playbook designer application 1405 may be utilized to establish the applications to execute in response to a trigger 1410 as a part of an orchestrated response. A state machine 1430 may have the three applications that form the response to the trigger stored on the Playbook server 1420. Each application may be executed for different programming environments (e.g., Java, python, etc.). The message broker 1440 may indicate the available environments 1450, 1452, 1454, 1456, and the indicated application may be delivered to a specific environment 1456 that is serving a particular network security analyst or network. The Playbook designer application 1405 may be used to select trigger 1410 from a list of predetermined triggers, used to create/design a new customized trigger event, and/or select a customized trigger event from an app service, which may be an application that was built to serve as a customized network security trigger event that is run on a server.

For example, as a Playbook executes, and different applications associated with the Playbook execute, a network security analyst may desire to execute specific applications, such as a block action that must be executed behind the network security analyst's firewall. Not every application may be a part of the block action. As an example, some of the applications may be a part of the logic or decision making with regard to whether or not to block a threat or trigger event. If it is determined to execute a block action, such action may be executed inside of an environment that has the ability to do so. The queues on the messages broker 1440 may represent a place to queue up processes or applications for execution for an environment. This may allow network security analyst's network to become disconnected without losing actions or applications that need to be executed inside the environment. It can also improve scalability and availability.

Figure 15:
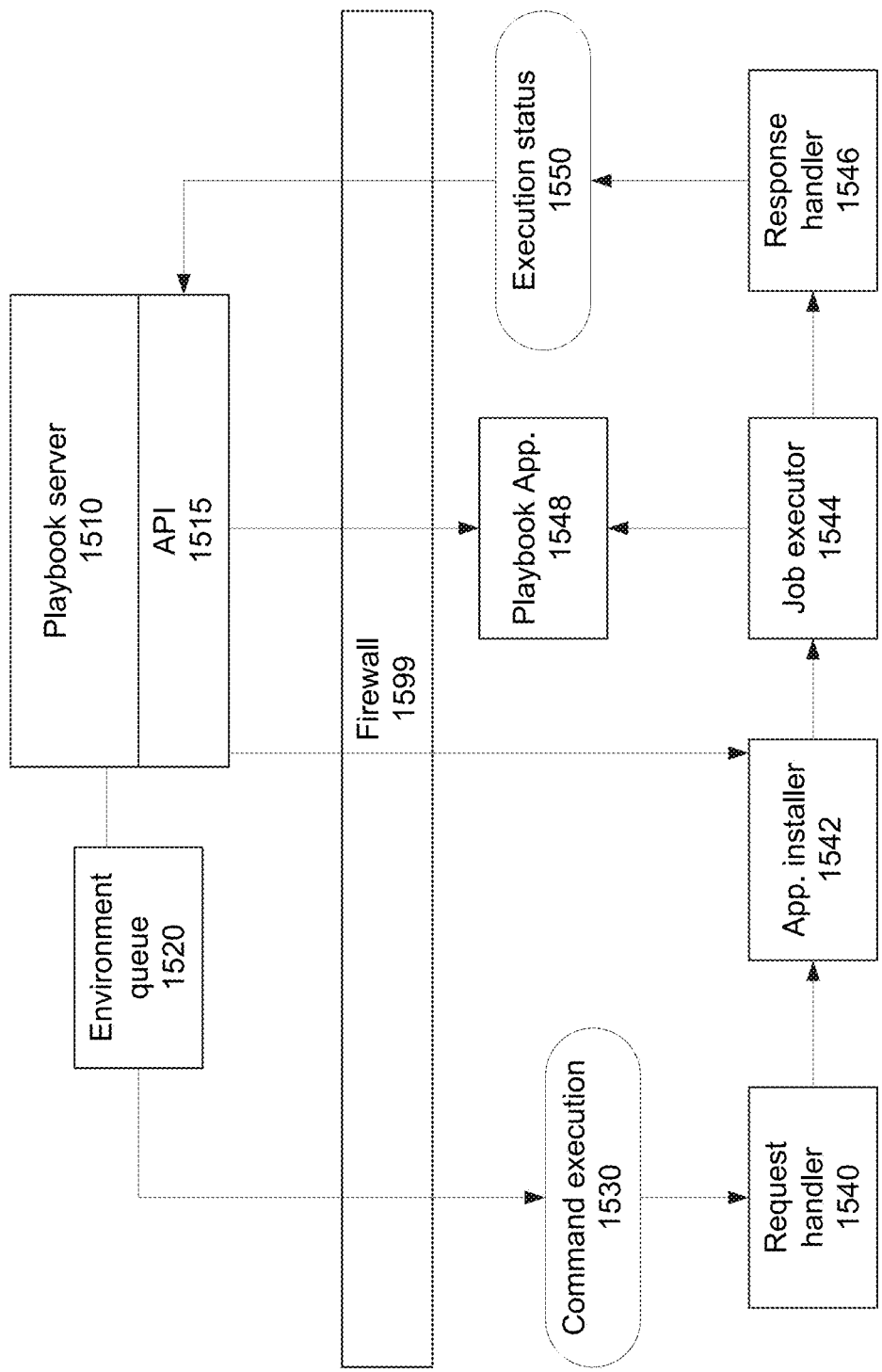
FIG. 15 is an example embodiment of the relay execution lifecycle between a block action and when the environment server sends out an execution status to the Playbook server.

FIG. 15 is an example embodiment of the relay execution lifecycle between a block action and when the environment server sends out an execution status to the Playbook server. The Playbook server 1510 may be operably connected to an API 1515 as well as the environment queue 1520. The environment queue 1520 may store commands or applications for execution by a computer system inside a firewall 1599. Command execution 1530 may initiate the orchestrated response to a threat. The request handler 1540 may analyze the action and determine whether it should execute, and if so, how it should execute. The application installer 1542 may download and install an application that needs to be executed locally and that may not be currently installed or available. The application installer 1542 may automatically request the application 1548 directly from the Playbook server 1510 via the API 1515 and automatically install the application 1548. The job executor 1544 may refer to code that initiates that application 1548 and monitors the application 1548 while it is running. The response handler 1546 may collect exit information about the application 1548 such as completion data. The execution status 1550 may refer to sending the status of the application 1548 back to the Playbook server 1510 so that it can be viewed on the server 1510 by a user, for example.

Figure 16:
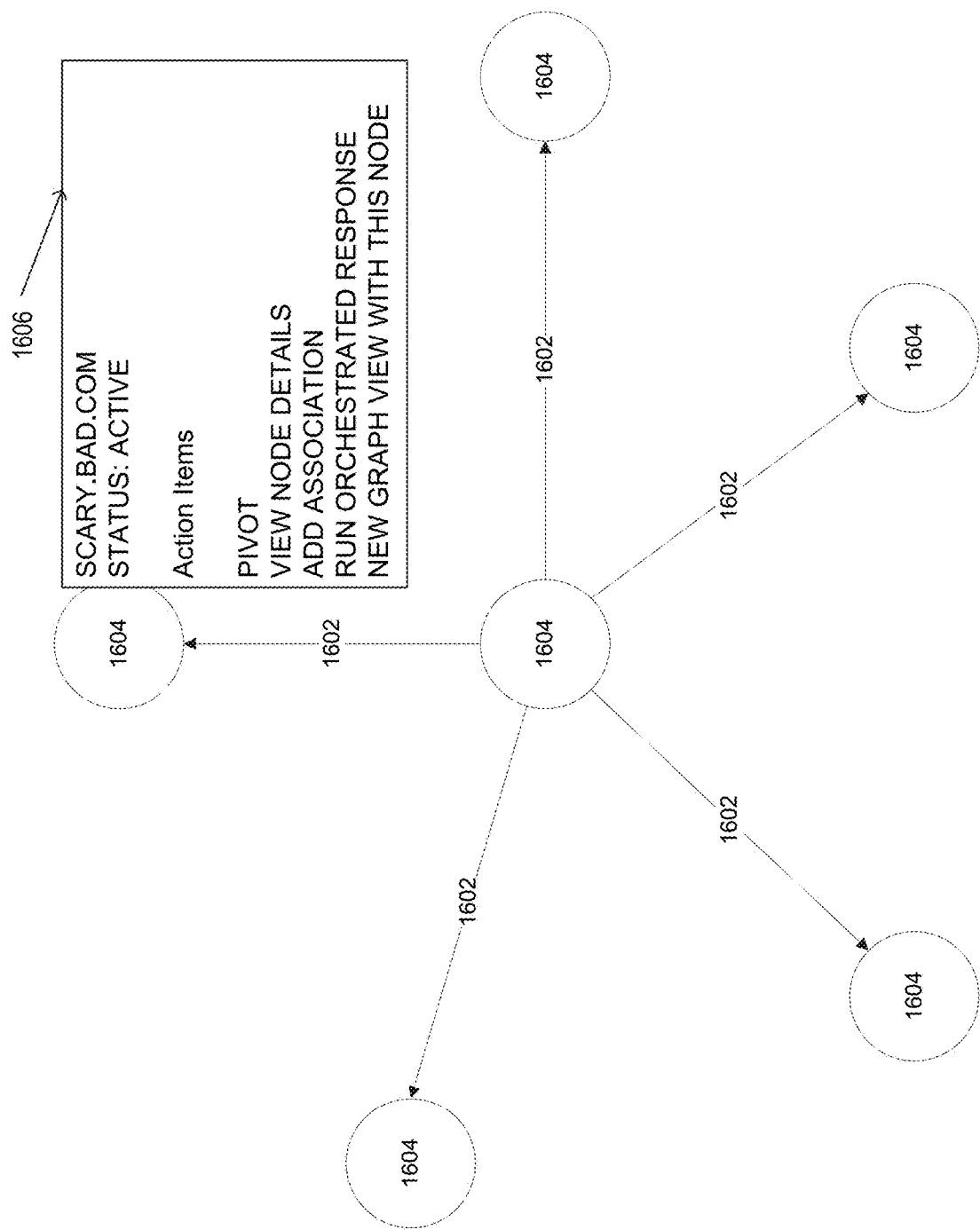
FIG. 16 depicts exemplary graph view of indicators of compromise and/or analytics according to embodiments of the present disclosure.

FIG. 16 depicts exemplary graph view of indicators of compromise and/or analytics according to embodiments of the present disclosure. For example, the graph view may be tied into an orchestration toolkit of orchestrated responses that enables network security analyst to launch automated tasks while doing an investigation within a graph view/link analysis view. Further, the graph view may be tied into crowdsourced analytics that enables network security analyst to pivot on indicators of compromise and view information related to observations, false positives, impressions, and feeds reporting the indicators. Network security analyst may return information related to industries that the indicator of compromise has been used against. The graph view may be a visualization tools to help network security analyst understand and display links that exist between indicators of compromise, threat actor groups, malware families, etc. The graph view may help network security analyst quickly see what items are related to one another and extract deeper into pieces of information that may lead the network security analyst to additional information that can be utilized to better protect an organization's computer networks. With the help of graph view, a network security analyst may determine whether indicators of compromise he or she comes across have been used against an organization, are false positives, and/or if they have been observed in activity targeting an industry. Moreover, when a network security analyst find lines of investigation that may be pursued, the network security analyst may have to log into additional tools to pull those threads and then return to their threat intelligence and response platform, enter that information into the platform, link it to the appropriate pieces of information, and then return to the link analysis. Then, if the network security analyst wants to launch a set of automated tasks related to the data, the network security analyst may have to go to another page or tool and perform those actions. Thus, graph may reduce the time need to perform these actions and reduce a chance of a loss of focus on a part of the network security analyst.

As shown in FIG. 16, graph view 1600 may include a plurality of links 1602 that point out connections between nodes 1604. Each node 1604 being one of an indicator of compromise, threat actor group, malware family, etc. The links 1602 may specify a type of connection between nodes

1604, and nodes 1604 may identify the node as being one of an indicator of compromise, threat actor group, malware family, etc. When a network security analyst selects one of the nodes 1604, an options box 1606 may be displayed. The options box 1606 may include a name of the node, a status of the node, and one or more action items that may be performed on the node, such as pivot, view node details, add an association, run an orchestrated response, and/or graph a new node view from the selected node 1606.

From the action items, data analytics may be derived that permeates nodes in the graph. The analytics may enable network security analyst to not only leverage aggregated, disparate data sources but rather analysis of that raw data as well. For example, the analytics learned may combine those inputs with its own heuristics and analytics to provide reputation scores for related items on the graph, classification of related entities, and recommendations for alerting and monitoring for related intelligence. The graph may also allow for exploration of both historical and current DNS resolutions via a DNS monitor. For example, the graph view may allow network security analyst to explore datasets to identify the current IP address of a domain of interest, historical IP addresses, and other websites that are (or have historically been) co-located with supporting infrastructure indicators due to the analytics dataset and the analytics.

The above-derived data depends on an ability to articulate information not just about the nodes on the graph, but the links between them as well. The data analytics may allow for rich expression of metadata about relationships when analysts are exploring datasets, including some data derived from the analytics dataset and the analytics. For example, the additions to the graph view help to express the nature of a relationship including when the node was first or last observed, whether node is considered "current," and how frequently the node was observed.

Through an ability to model relationships between indicators and higher-level grouping functions, such as specific threat groups, attack patterns, vulnerabilities, etc., derived metadata about the grouping functions may be provided. For example, the analytics dataset and the analytics may be able to not only tell you how often certain indicators were observed in the wild, but leverage those in relation to grouping functions to tell a network security analyst something like how often he or she is seeing a specific vulnerability being exploited in the wild.

Moreover through the use of a data model, "inferred" relationships between nodes may be provided. For example, if an IP address is hosting a domain that is known to leverage a particular attack pattern, such as a domain generation algorithm ("DGA"), the IP address may also be inferred to be leveraging that attack pattern. The analytics that yield these inferred relationships, and their respective confidence intervals, may empower network security analyst to link atomic investigative artifacts to higher-level patterns faster, providing higher fidelity and efficiency than existing manual techniques. Furthermore, based on the analytics aggregating threat information and supplementing the threat information with a team of network security analysts, a unified naming convention may be provided. By consolidating various aliases into a singular location, network security analysts may be enabled to assemble threat data into a flatter topology than is currently available. This framework is intended to be extensible not only for manual curation, but could eventually incorporate NLP-based analytics on submitted content to derive additional aliases and threat groups as they arise.

Embodiments of the presently disclosed subject matter may be implemented in and used with a variety of component and network architectures. FIG. 16 is an example computer 20 (e.g., a cloud-based server, server, database, smartphone, tablet, laptop, mobile device, server) suitable for implementing embodiments of the presently disclosed subject matter. The computer 20 can include a bus 21 which interconnects major components of the computer 20, such as a central processor 24, a memory 27 (typically RAM, but which may also include read-only memory ("ROM"), flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other suitable storage medium 25. A server (e.g., a cloud-based server) may be implemented as a cluster of computers 20, each of which may contain some or all of the aforementioned components.

The fixed storage 23 may be one or more storage devices and may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks. Many other devices or components (not shown) may be connected in a similar manner (e.g., digital cameras or speakers). Conversely, all of the components shown in FIG. 15 need not be present to practice the present disclosure. The components can be interconnected in different ways from that shown. Code to implement the present disclosure can be stored in computer-readable storage media such as one or more of the memory 27, fixed storage 23, removable media 25, or on a remote storage location.

Figure 17:
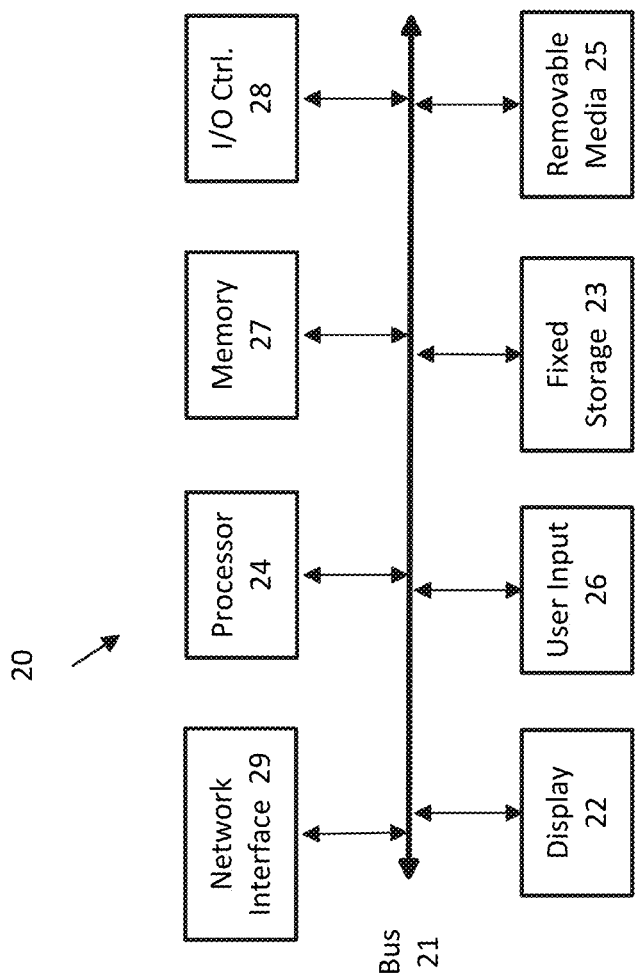
FIG. 17 is an example computer (e.g., server or local computer) suitable for implementing embodiments of the presently disclosed subject matter.
Figure 18:
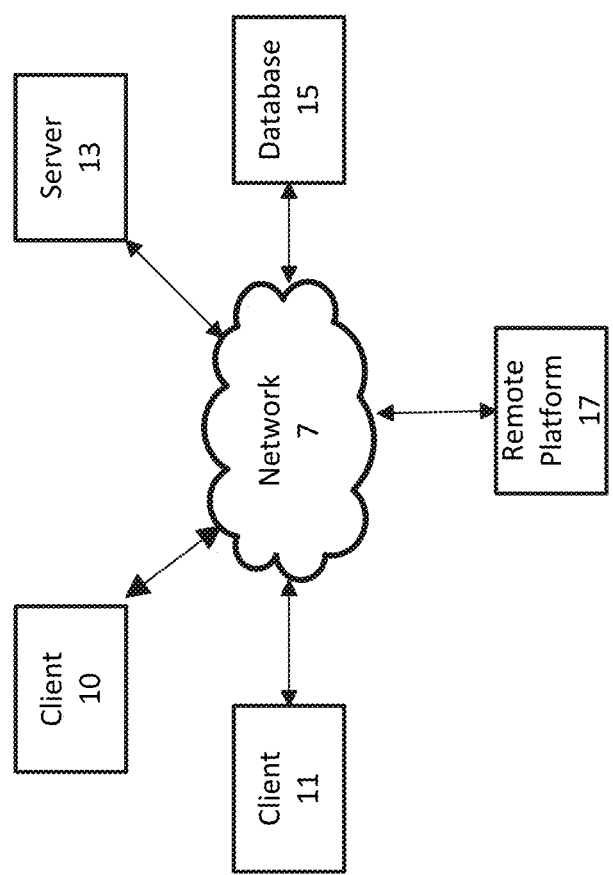
FIG. 18 shows an example network arrangement according to an embodiment of the disclosed subject matter.

FIG. 17 shows an example network arrangement according to an embodiment of the disclosed subject matter. One or more clients 10, 11, such as local computers, mobile devices, smartphones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the one or more clients 10, 11, or one or more other devices may provide intermediary access such as where a server 13 provides access to resources stored in a database 15. The one or more clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter.

When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments that illustrate improvements in the functioning of computing networks and cybersecurity applications. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A system for implementing a browser extension for cyber threat intelligence and response, comprising:
    a non-transitory memory configured to store instructions; and
    one or more hardware processors coupled to the non-transitory memory and configured to read the instructions from the non-transitory memory to cause the system to perform operations comprising:
    receiving, in a sandbox of a browser by a browser extension, a selection of at least a first indicator of compromise of the at least one of the indicator of compromise of at least scanned part of a web page;
    displaying, in the browser extension, one or more orchestrated responses to be performed on the selected first indicator of compromise;
    receiving, in the browser extension, a selection of at least a first orchestrated response of the one or more orchestrated responses;
    transmitting, by the browser extension, the selected first orchestrated response to be performed on the selected first indicator of compromise to the cloud-based enrichment and analysis of cybersecurity threat intelligence system;
    receiving, in the browser extension from the cloud-based enrichment and analysis of cybersecurity threat intelligence system, a response including a result of the selected first orchestrated response; and
    displaying, in the browser extension, the result of the selected first orchestrated response, wherein the result includes a status of the deployment of selected first orchestrated response, an ability to pause deployment of selected first orchestrated response, and an ability to redeploy the selected first orchestrated response.

2. The system of claim 1, wherein receiving the selection of the selected first indicator of compromise includes a selection to rescan at least one of the web page in entirety and the at least part of the web page, and
    wherein the one or more hardware processors coupled to the non-transitory memory and configured to read the instructions from the non-transitory memory to cause the system to further perform operations comprising:
    rescanning, in the sandbox of the browser by the browser extension, at least one of the web page in entirety and the at least part of the web page to produce a rescanned set of items of interests; and
    transmitting, by the browser extension, the rescanned set of items of interests to the cloud-based enrichment and analysis of cybersecurity threat intelligence system to request information on the set of items.

3. The system of claim 1, wherein the one or more hardware processors coupled to the non-transitory memory and configured to read the instructions from the non-transitory memory to cause the system to further perform operations comprising:
    displaying, in the browser extension when the first orchestrated response to be performed is selected, one or more of an explanation box that describes the selected first orchestrated response, a list of a plurality of orchestrated responses, and actor selector that enables starting, pausing, retrying of the plurality of orchestrated responses, and a status of the each of the plurality of orchestrated responses.

4. The system of claim 3, wherein the receiving the selection of the first orchestrated response of the one or more orchestrated responses includes:

receiving, in the browser extension, a selection of a plurality of particular orchestrated responses of the one or more orchestrated responses, wherein the plurality of particular orchestrated responses are performed one of simultaneous or sequentially.

5. The system of claim 4, wherein displaying the result of the selected first orchestrated response includes displaying the result in a graph view.

6. The system of claim 1, wherein the one or more hardware processors coupled to the non-transitory memory and configured to read the instructions from the non-transitory memory to cause the system to further perform operations comprising:

installing the browser extension in the browser, the browser extension configured to connect over a communications network to the cloud-based enrichment and analysis of cybersecurity threat intelligence system, and the browser extension enabling the network security analyst to scan web pages for indicators of compromise and observables and deploy orchestrated responses on the indicators of compromise and observables; and receiving, in the browser extension, a configuration of the browser extension with one or more parameters that indicate one or more fields and one or more sources to be queried by the cloud-based enrichment and analysis of cybersecurity threat intelligence system.

7. The system of claim 6, wherein the configuration received includes default fields that include a plurality of predetermined fields and default sources that include a plurality of predetermined sources to be included in the scan results.

8. A method for implementing a browser extension for cyber threat intelligence and response, the method comprising:

receiving, in a sandbox of a browser by a browser extension, a selection of at least a first indicator of compromise of the at least one of the indicator of compromise of at least scanned part of a web page;

displaying, in the browser extension, one or more orchestrated responses to be performed on the selected first indicator of compromise;

receiving, in the browser extension, a selection of at least a first orchestrated response of the one or more orchestrated responses;

transmitting, by the browser extension, the selected first orchestrated response to be performed on the selected first indicator of compromise to the cloud-based enrichment and analysis of cybersecurity threat intelligence system;

receiving, in the browser extension from the cloud-based enrichment and analysis of cybersecurity threat intelligence system, a response including a result of the selected first orchestrated response; and displaying, in the browser extension, the result of the selected first orchestrated response, wherein the result includes a status of the deployment of selected first orchestrated response, an ability to pause deployment of selected first orchestrated response, and an ability to redeploy the selected first orchestrated response.

9. The method of claim 8, wherein receiving the selection of the selected first indicator of compromise includes a selection to rescan at least one of the web page in entirety and the at least part of the web page, and wherein the method further comprising:

rescanning, in the sandbox of the browser by the browser extension, at least one of the web page in entirety and the at least part of the web page to produce a rescanned set of items of interests;

transmitting, by the browser extension, the rescanned set of items of interests to the cloud-based enrichment and analysis of cybersecurity threat intelligence system to request information on the set of items.

10. The method of claim 8, further comprising:

displaying, in the browser extension when the first orchestrated response to be performed is selected, one or more of an explanation box that describes the selected first orchestrated response, a list of a plurality of orchestrated responses, and actor selector that enables starting, pausing, retrying of the plurality of orchestrated responses, and a status of the each of the plurality of orchestrated responses.

11. The method of claim 8, wherein the receiving the selection of the first orchestrated response of the one or more orchestrated responses includes:

receiving, in the browser extension, a selection of a plurality of particular orchestrated responses of the one or more orchestrated responses, wherein the plurality of particular orchestrated responses are performed one of simultaneous or sequentially.

12. The method of claim 11, wherein displaying the result of the at least one particular orchestrated response includes displaying the result in a graph view.

13. The method of claim 8, further comprising:

installing the browser extension in the browser, the browser extension configured to connect over a communications network to the cloud-based enrichment and analysis of cybersecurity threat intelligence system, and the browser extension enabling the network security analyst to scan web pages for indicators of compromise and observables and deploy orchestrated responses on the indicators of compromise and observables; and receiving, in the browser extension, a configuration of the browser extension with one or more parameters that indicate one or more fields and one or more sources to be queried by the cloud-based enrichment and analysis of cybersecurity threat intelligence system.

14. The method of claim 13, wherein the configuration received includes default fields that include a plurality of predetermined fields and default sources that include a plurality of predetermined sources to be included in the scan results.

15. A non-transitory memory for implementing a browser extension for cyber threat intelligence and response, the non-transitory memory storing instructions to cause the system to perform operations comprising:

receiving, in a sandbox of a browser by a browser extension, a selection of at least a first indicator of compromise of the at least one of the indicator of compromise of at least scanned part of a web page;

displaying, in the browser extension, one or more orchestrated responses to be performed on the selected first indicator of compromise;

receiving, in the browser extension, a selection of at least a first orchestrated response of the one or more orchestrated responses;

transmitting, by the browser extension, the selected first orchestrated response to be performed on the selected first indicator of compromise to the cloud-based enrichment and analysis of cybersecurity threat intelligence system;

receiving, in the browser extension from the cloud-based enrichment and analysis of cybersecurity threat intelligence system, a response including a result of the selected first orchestrated response; and displaying, in the browser extension, the result of the selected first orchestrated response, wherein the result includes a status of the deployment of selected first orchestrated response, an ability to pause deployment of selected first orchestrated response, and an ability to redeploy the selected first orchestrated response.

16. The non-transitory memory of claim 15, wherein receiving the selection of the selected first indicator of compromise includes a selection to rescan at least one of the web page in entirety and the at least part of the web page, and wherein the instructions to cause the system to perform operations further comprising:

rescanning, in the sandbox of the browser by the browser extension, at least one of the web page in entirety and the at least part of the web page to produce a rescanned set of items of interests;

transmitting, by the browser extension, the rescanned set of items of interests to the cloud-based enrichment and analysis of cybersecurity threat intelligence system to request information on the set of items.

17. The non-transitory memory of claim 15, wherein the instructions to cause the system to perform operations further comprising:

displaying, in the browser extension when the first orchestrated response to be performed is selected, one or more of an explanation box that describes the selected first orchestrated response, a list of a plurality of orchestrated responses, and actor selector that enables starting, pausing, retrying of the plurality of orchestrated responses, and a status of the each of the plurality of orchestrated responses.

\* \* \* \* \*